(12) United States Patent
Alan

(10) Patent No.: US 11,148,549 B1
(45) Date of Patent: Oct. 19, 2021

(54) SYSTEMS AND METHODS FOR CHARGING PARKED VEHICLES

(71) Applicant: Dasher Lawless Technologies, LLC, Warren, OH (US)

(72) Inventor: Christopher Alan, Valley Glen, CA (US)

(73) Assignee: Dasher Lawless Technologies, LLC, Warren, OH (US)

( * ) Notice: Subject to any disclaimer, the term of this patent is extended or adjusted under 35 U.S.C. 154(b) by 0 days.

(21) Appl. No.: 17/302,062

(22) Filed: Apr. 22, 2021

(51) Int. Cl.
| | |
|---|---|
| *B60L 53/67* | (2019.01) |
| *B60L 53/18* | (2019.01) |
| *B60L 53/62* | (2019.01) |
| *B60L 53/30* | (2019.01) |

(52) U.S. Cl.
CPC .............. *B60L 53/67* (2019.02); *B60L 53/18* (2019.02); *B60L 53/62* (2019.02); *B60L 53/305* (2019.02); *B60L 2250/16* (2013.01)

(58) Field of Classification Search
CPC ....................................................... B60L 53/67
USPC ........................................................ 320/137
See application file for complete search history.

(56) References Cited

U.S. PATENT DOCUMENTS

| | | | |
|---|---|---|---|
| 4,279,563 | A | 7/1981 | Miller |
| 5,049,022 | A | 9/1991 | Wilson |
| 5,464,082 | A | 11/1995 | Young |
| 6,049,745 | A | 4/2000 | Douglas et al. |
| 6,662,077 | B2 | 12/2003 | Haag |
| 6,851,921 | B2 | 2/2005 | Haag |
| 7,181,409 | B1* | 2/2007 | Murakami .............. B60L 53/68 705/5 |
| 8,632,290 | B2 | 1/2014 | Alan |
| 2002/0164234 | A1* | 11/2002 | Haag ...................... E04H 6/422 414/277 |
| 2006/0043176 | A1 | 3/2006 | Meyerhofer et al. |
| 2006/0255119 | A1 | 11/2006 | Marchasin et al. |
| 2007/0112620 | A1 | 5/2007 | Johnson et al. |
| 2007/0128009 | A1 | 6/2007 | Lee |
| 2008/0251575 | A1 | 10/2008 | Bowling et al. |
| 2009/0026254 | A1 | 1/2009 | Johnson et al. |
| 2009/0078172 | A1 | 3/2009 | Kaufmann et al. |
| 2009/0148259 | A1* | 6/2009 | Shani ...................... E04H 6/183 414/231 |

(Continued)

OTHER PUBLICATIONS

Dasher Lawless Automation AUTOParkit found at: https://dasherlawless.com/automation/autoparkit/ printed on Apr. 20, 2021, 6 pages.

*Primary Examiner* — Jerry D Robbins
(74) *Attorney, Agent, or Firm* — Knobbe, Martens, Olson & Bear LLP

(57) ABSTRACT

Methods and systems are disclosed configured to charge an electrical vehicle. A charge request is received for a first electrical vehicle parked at a first parking spot. A battery charging device is connected to a first head unit comprising a first charging cable located in proximity to the first parking spot. A charge request is received for a second electrical vehicle parked at a second parking spot. A determination is made as whether the first electrical vehicle is no longer being charged, and in response to determining that the first electrical vehicle is no longer being charged, the battery charging device is disconnected from the first head unit and is connected to a second head unit comprising a second charging cable located in proximity to the second parking spot.

25 Claims, 15 Drawing Sheets

(56) References Cited

U.S. PATENT DOCUMENTS

| | | | |
|---|---|---|---|
| 2009/0216876 A1 | 8/2009 | Hsieh et al. | |
| 2011/0074350 A1* | 3/2011 | Kocher | B60L 55/00 |
| | | | 320/109 |
| 2011/0074351 A1* | 3/2011 | Bianco | G07F 15/005 |
| | | | 320/109 |
| 2011/0140658 A1* | 6/2011 | Outwater | B60L 53/35 |
| | | | 320/109 |
| 2011/0182703 A1* | 7/2011 | Alan | E04H 6/183 |
| | | | 414/231 |
| 2013/0069592 A1* | 3/2013 | Bouman | H02J 7/007 |
| | | | 320/109 |
| 2013/0335025 A1* | 12/2013 | Kuribayashi | B60L 53/11 |
| | | | 320/109 |
| 2019/0070970 A1* | 3/2019 | Chan | B60L 53/65 |
| 2019/0217718 A1* | 7/2019 | Arregui Torres | B60L 53/11 |
| 2020/0269835 A1* | 8/2020 | Hara | G07C 5/004 |
| 2021/0101500 A1* | 4/2021 | Brombach | B60L 53/31 |

* cited by examiner

SYSTEMS AND METHODS FOR CHARGING PARKED VEHICLES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to the management of charging of battery powered motorized devices such as vehicles.

Description of the Related Art

Fossil fuel-powered vehicles are a significant source of carbon emissions. According to certain estimates, 24 pounds of carbon dioxide and other global-warming gases are emitted for every gallon of gas consumed. According to the Environmental Protection Agency, greenhouse gas emissions from transportation account for about 28 percent of total U.S. greenhouse gas emissions, making it the largest contributor of U.S. greenhouse gas emissions.

In order to reduce the emission of greenhouse gases, battery powered vehicles are becoming ever more important solution.

Disadvantageously, the infrastructure needed to charge electric vehicles can be prohibitively expensive or simply not feasible in dense vehicle parking situations, such as in a residential tower or in a large surface parking lot.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to systems and methods configured to identify a first vehicle as an electric vehicle. The first vehicle is caused to be navigated to a transportable pallet having a charging cable coupled thereto. A determination is made that a charging station is available to receive the first vehicle. The pallet, with the first vehicle thereon, is transported to the available charging station. The charging cable, coupled to the pallet, is connected to a charging device and the first vehicle is charged. At least partly in response to detecting that the first vehicle has completed charging, the pallet is automatically conveyed, with the first vehicle positioned thereon, to a parking area. The first vehicle is conveyed to a parking location within the parking area.

An aspect of the present disclosure relates to systems and methods configured to charge an electrical vehicle. A charge request is received for a first electrical vehicle parked at a first parking spot. A battery charging device is connected to a first head unit, comprising a first charging cable, located in proximity to the first parking spot. A charge request is received for a second electrical vehicle parked at a second parking spot. A determination is made as whether the first electrical vehicle is no longer being charged, and at least partly in response to determining that the first electrical vehicle is no longer being charged, the battery charging device is disconnected from the first head unit and is connected to a second head unit comprising a second charging cable located in proximity to the second parking spot.

An aspect of the disclosure relates to a system, comprising: at least one processing device; non-transitory memory that stores programmatic instructions that when executed by the at least one processing device cause the system to perform operations comprising: identifying a first vehicle within a parking facility as an electric vehicle; causing the first vehicle to be navigated to a first area; detecting that the first vehicle is positioned on a transportable pallet located in the first area; determining whether a vehicle charging station is available to receive the first vehicle; at least partly in response to: detecting that the first vehicle is positioned on the transportable pallet, and determining that a vehicle charging station is available to receive the first vehicle: automatically causing the pallet to be conveyed, with the first vehicle positioned thereon, to the vehicle charging station; detecting that a vehicle charging cable, coupled to the pallet, is inserted into a charge port of the first vehicle; causing the vehicle charging cable, coupled to the pallet, to be connected to a vehicle charging device; causing the first vehicle to be charged using the vehicle charging device; detecting that the first vehicle has completed charging the first vehicle; at least partly in response to detecting that the first vehicle has completed charging, causing the pallet to be automatically conveyed, with the first vehicle positioned thereon, to a parking area; and causing the first vehicle to be conveyed to a parking location within the parking area.

An aspect of the disclosure relates to a computerized method, the method comprising: determining that a first vehicle within a parking facility is an electric vehicle; determining that the first vehicle is positioned on a transportable pallet; determining whether a vehicle charging station is available to receive the first vehicle; at least partly in response to determining that the first vehicle is positioned on the pallet and that a vehicle charging station is available to receive the first vehicle: causing the pallet, with the first vehicle positioned thereon, to be conveyed to the available vehicle charging station; determining that a vehicle charging cable is connected to the first vehicle; connecting the vehicle charging cable, coupled to the pallet, to a vehicle charging device; charging the first vehicle using the vehicle charging device; detecting that the first vehicle has completed charging the first vehicle; and at least partly in response to detecting that the first vehicle has completed charging, causing the pallet to be conveyed, with the first vehicle positioned thereon, to a first location.

An aspect of the disclosure relates to a non-transitory memory that stores programmatic instructions that when executed by at least one processing device cause the at least one processing device to perform operations comprising: identifying a first electric vehicle at a parking facility; determining that the first electric vehicle is positioned on a transportable pallet; determining whether a vehicle charging station is available to receive the first electric vehicle; at least partly in response to determining that the first electric vehicle is positioned on the pallet and that a vehicle charging station is available to receive the first electric vehicle: causing the pallet, with the first electric vehicle positioned thereon, to be conveyed to the vehicle charging station; causing a vehicle charging cable, coupled to the pallet, to be connected to a vehicle charging device; charging the first electric vehicle using the vehicle charging device; detecting that the first electric vehicle has completed charging the first electric vehicle; at least partly in response to detecting that the first electric vehicle has completed charging, causing the pallet to be conveyed, with the first electric vehicle positioned thereon, to a first location.

An aspect of the disclosure relates to a system, comprising: at least one processing device; non-transitory memory that stores programmatic instructions that when executed by the at least one processing device cause the system to perform operations comprising: determining that a charge request is received for a first electrical vehicle parked at a first parking spot in a first electrical vehicle parking area; determining whether a first battery charging device is available to charge the first electrical vehicle; at least partly in response to determining that a charge request is received for the first electrical vehicle parked at the first parking spot in a first electrical vehicle parking area and determining that the first battery charging device is available to charge the first electrical vehicle, connecting the first battery charging device to a first head unit comprising a first charging cable located in proximity to the first parking spot; determining that a charge request is received for a second electrical vehicle parked at a second parking spot in the first electrical vehicle parking area; determining whether the first electrical vehicle is no longer being charged; at least partly in response to determining that the first electrical vehicle is no longer being charged, disconnecting the first battery charging device from the first head unit located in proximity to the first parking spot; and at least partly in response to the charge request received for the second electrical vehicle parked at the second parking spot in the first electrical vehicle parking area and in response to determining that the first electrical vehicle is no longer being charged, connecting the first battery charging device to a second head unit comprising a second charging cable located in proximity to the second parking spot.

An aspect of the disclosure relates to a computer implemented method, the method comprising: determining that a charge request is received for a first electrical vehicle parked at a first parking spot in a first electrical vehicle parking area; determining whether a first battery charging device is available to charge the first electrical vehicle; at least partly in response to determining that the charge request is received for the first electrical vehicle parked at the first parking spot in the first electrical vehicle parking area and that the first battery charging device is available to charge the first electrical vehicle, connecting the first battery charging device to a first head unit comprising a first charging cable located in proximity to the first parking spot; determining that a charge request is received for a second electrical vehicle parked at a second parking spot in the first electrical vehicle parking area; determining whether the first electrical vehicle is no longer being charged; at least partly in response to determining that the first electrical vehicle is no longer being charged, disconnecting the first battery charging device from the first head unit located in proximity to the first parking spot; and at least partly in response to the charge request received for the second electrical vehicle parked at the second parking spot in the first electrical vehicle parking area and in response determining that the first electrical vehicle is no longer being charged, connecting the first battery charging device to a second head unit comprising a second charging cable located in proximity to the second parking spot.

An aspect of the disclosure relates to a non-transitory memory that stores programmatic instructions that when executed by at least one processing device cause the at least one processing device to perform operations comprising: determining that a charge request is received for a first electrical vehicle parked at a first parking spot; determining whether a first battery charging device is available to charge the first electrical vehicle; at least partly in response to determining that the charge request is received for the first electrical vehicle parked at the first parking spot and that the first battery charging device is available to charge the first electrical vehicle, connecting the first battery charging device to a first head unit comprising a first charging cable located in proximity to the first parking spot; determining that a charge request is received for a second electrical vehicle parked at a second parking spot; determining whether the first electrical vehicle is no longer being charged; at least partly in response to determining that the first electrical vehicle is no longer being charged, disconnecting the first battery charging device from the first head unit located in proximity to the first parking spot; and at least partly in response to the charge request received for the second electrical vehicle parked at the second parking spot and in response determining that the first electrical vehicle is no longer being charged, connecting the first battery charging device to a second head unit comprising a second charging cable located in proximity to the second parking spot.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

Figure 1A:
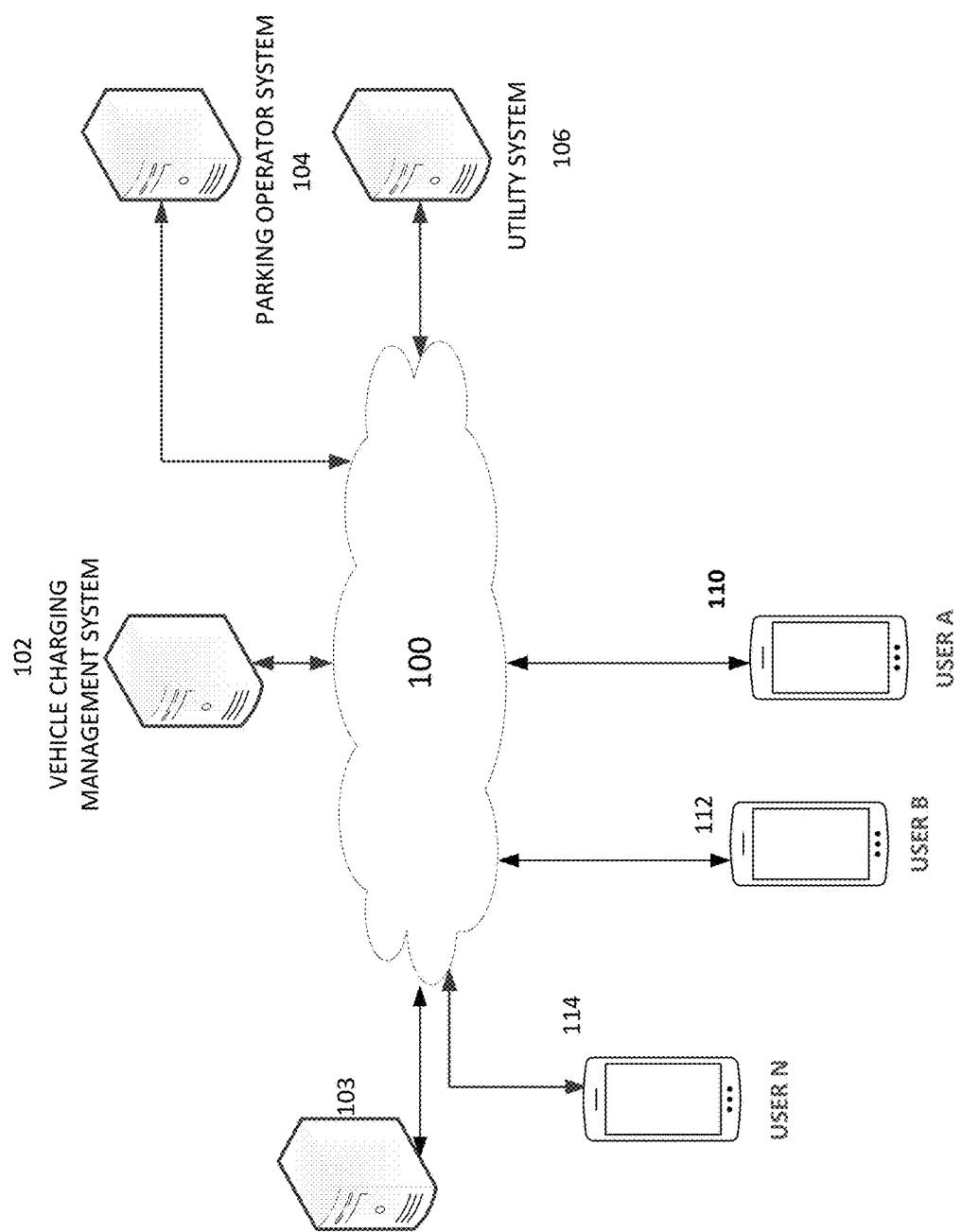
FIG. 1A illustrates an example operating environment.

An aspect of the present disclosure relates to systems and methods configured to charge battery powered, motorized systems, such as electric vehicles.

Electric cars mandates are becoming ever more common, with many countries intending to phase out carbon fuel vehicles by respective deadlines. Further, many car manufactures have announced that they intend to cease manufacturing carbon fuel vehicles. Currently, many cities and countries require that a certain percentage of parking spaces in parking facilities are available or ready for charging electric vehicles.

However, the infrastructure needed to charge electric vehicles can be prohibitively expensive or simply not feasible in dense vehicle parking situations, such as in a residential tower or in a large surface parking lot. For example, the power needed to charge 500 vehicles at the same time, at 50 kW per vehicle charger would require a 25 MW service. The local electricity utility is likely to be unable to provide such power at a single location. Further, assuming 3 vehicles per AC-DC rectifier used to provide DC power to vehicle stall charger modules, a total of 167 rectifiers may be required to simultaneously charge 500 vehicles. The large number of rectifiers will require a commensurate amount of rectifier manufacture with the attendant manufacturing waste and pollution. Such pollution may nullify many of the environmental benefits of electric vehicles.

Further, the cost of providing a charging station and the space needed to locate a charging station at each parking spot can be prohibitive for dense vehicle parking situations, such as parking lots.

Certain disclosed technical solutions address the foregoing technical power distribution challenges for charging electric vehicles. Optionally, different solutions may be used for different environments.

For example, as discussed herein in greater detail, a multistory parking structure may include a vehicle charging system including a certain number of charging stalls associated with electric vehicle charging stations. Vehicles may be rotated in and of the charging stations using a conveyor system (e.g., a rail system), where the selection of a vehicle for charging may optionally be based on one or more criteria. Further, the removal of a vehicle from a charging station may be based on one or more criteria (e.g., the vehicle has completed charging or a user has requested the vehicle). The charging system many be modular making it easier to add additional charging stalls as needed.

As will be described, an example architecture may include pallets on which a vehicle may be positioned, a lift to lift vehicles and/or pallets (optionally with the vehicle thereon) vertically onto rollers or between levels of a multilevel storage facility (e.g., a parking structure), a shuttle to move pallets (optionally with the vehicle thereon) horizontally between stalls on the same level, parking stalls to store vehicles until a user requests the user's vehicle return, buffer areas to store vehicles until an appropriate charging stall is available to charge a given vehicle, and charging stalls equipped with charging stations to charge vehicles.

Advantageously, a turntable feature may be provided where the user may drive the vehicle head-in onto a pallet when providing the vehicle for charging or parking, and when the user reclaims the vehicle, the pallet, with the vehicle thereon, may be rotated (e.g., 180 degrees) so that it is front facing to make exiting the parking facility safer, easier and quicker. As will be discussed, multiple connectors and/or patch cables may be provided with the pallet so regardless of the orientation of the pallet in a loading bay, a patch cable will be appropriately positioned so as to enable the user to plug the patch cable into the vehicle.

By way of further example, for a surface parking lot (or other lot that does not include a mechanism for automatically ferrying vehicles to charging stations), the vehicles may be parked in a parking spot, and rather than rotate the vehicles to charging stations, a given charging station may be configured to provide charging services to multiple parking spots serially (rather than in parallel).

For example, each parking spot in a set of parking spots may include a head unit (which may or may not include active components, such as solid state controller devices) that includes a charging cable configured to be inserted into an electric vehicle charge port. Each of the head units for the set of parking spots may in turn be connected to a common charge station that actually provides the vehicle charging power to charge the vehicles batteries. The common charge station may include a mechanism for selectively providing power to only a subset of the head units (and hence to electric vehicles plugged into the head units) at a time. For example, if the set of head units includes four head units, the common charge station may be configured to only provide power to one (or two, or three) of the head units at a time. Once the electric vehicles plugged into the powered subset of head units have completed charging or have been unplugged, the common charge station may detect the same and then cease providing power to that subset of head units, and may proceed to provide to provide power to another subset of head units having electric vehicles plugged in.

By way of illustration, each head unit may be connectable to a power rail connected to the common charge station. For example, each head unit may be removably connectable via a solid state or electro-mechanical contactor under control of the common charge station, where the common charge station (which may include a PLC) may serially connect (and disconnect) subsets of head units to and from the power rail. For example, the contactor may be configured to open or close an electrical circuit. The contactor may be configured to be normally open and to close, and thereby provide operating power to the load, when the contactor coil is energized. The contactor may optionally be in the form of a hydraulically operated coupler that, in response to a command, couples the head unit to the power rail.

Optionally, in another configuration, the charging stations and/or head units may be mobile (e.g., may be transported on a rail system) and moved to charge vehicles at respective parking spots based on one or more criteria.

Referring now to FIG. 1A, an architecture is illustrated that may be utilized to enable electric vehicles to be charged in parking facilities (e.g., multilevel parking structures), where vehicles are rotated in and out of charging stalls, where there are significantly fewer charging stalls then parking spots. The various systems and devices may communicate with each other over one or wired and/or wireless networks 100 (e.g., the Internet, Ethernet, or other wide area or local area network).

A vehicle charging management system 102 may be utilized to control vehicle conveyor systems and charging systems within a parking facility and to perform other functions described herein.

A data collection system 103 may be connected to one or more remote vehicle charging management systems. The data collection system 103 may collect data from the vehicle charging management systems, such as some or all the sensor data collected by the vehicle charging management systems and/or some or all of the commands issued by and actions taken by the vehicle charging management systems. The data may include identifiers associated with users whose vehicles were charged within a given period of time (e.g., the last 24 hours, the last week, the last month, etc.), the amount of electrical power used to charge respective vehicles, the time of day respective vehicles were charged, and/or the like.

The data collection system 103 may use such charging and vehicle-related data to determine how much a given user is to be invoiced for such vehicle charging, and the invoice may be electrically transmitted to the user (e.g., via email, text message, website, etc.), and/or a user's payment instrument may be correspondingly charged. Optionally, the identifiers associated with users whose vehicles were charged in a given period of time (e.g., the last 24 hours, the last week, the last month, etc.), the amount of electrical power used to charge respective vehicles, and/or the times respective vehicles were charged, may be transmitted to a parking operator system (which may be the owner/operator of the parking structure), which in turn may optionally invoice users for charging services using the foregoing data.

In the illustrated embodiment, the data collection system 103 may be hosted on one or more servers. The data collection system 103 may be cloud-based and may be accessed by one or more user devices 110, 112 over the network 100.

User devices 110, 112, 114, vehicle charging management system 102, data collection system 103, parking operator system 104, and/or utility system 106 may be configured to share software applications, computing resources, and data storage.

Optionally, a software application configured to interact with a user's electric vehicle and/or the vehicle charging management system 102 may be downloaded from the vehicle charging management system 102 and/or an application store to one or more of the user devices 110, 112, 114. Optionally, functionality provided by the software application may be instead or in addition be accessed via a web browser hosted on a user device from a remote web server.

The software application may optionally enable a user to communicate with the user's vehicle (e.g., to determine charge levels, to turn on or off a vehicle alarm, to cause the vehicle to automatically park or drive onto a pallet, etc.), to purchase or pay for vehicle charging services (e.g., to view and pay invoices), to receive charge status data (e.g., scheduled to be charged, charging, charging complete, parked), to receive parking location data from the vehicle charging management system 102, and/or the like.

The user devices 110, 112, 114 may be in the form of a desktop computer, laptop computer, tablet computer, mobile phone, smart television, smart wearable device (e.g., a smart watch, smart eyeglasses, etc.), cloud-based system, a system mounted in a user vehicle, and/or other computing system. A user device may include user input and output devices, such displays (touch or non-touch displays), speakers, microphones (e.g., to accept voice commands or to enable voice calls), trackpads, mice, pen input, printers, haptic feedback devices, cameras, and/or the like. A user device may include wireless and/or wired network interfaces (e.g., Bluetooth, Wi-Fi, and/or other network interfaces) via which the user may communicate with the user's vehicle, the parking operator system 104, the vehicle charging management system 102, the data collection system 103, and/or other systems and devices over one or more networks.

User interfaces described herein are optionally configured to present data (optionally in real time) from sources described herein and to receive user data and commands, which may optionally be executed by the vehicle charging management system 102 (and/or other systems described herein), optionally in real time.

Optionally, a version of the user interfaces described herein may be enhanced for use with a small touch screen (e.g., 1 to 15 inches diagonal), such as that of a mobile phone, a small tablet computer, a smart watch, or a vehicle dash display. For example, the orientation of the controls may be relatively more vertical rather than horizontal to reflect the height/width ratio of typical mobile device display and certain vehicle displays. Further, the user interfaces may utilize contextual controls that are displayed in response to an inferred user desire, rather than displaying a large number of tiny controls at the same time (which would make them hard to select or manipulate using a finger).

Figure 1B:
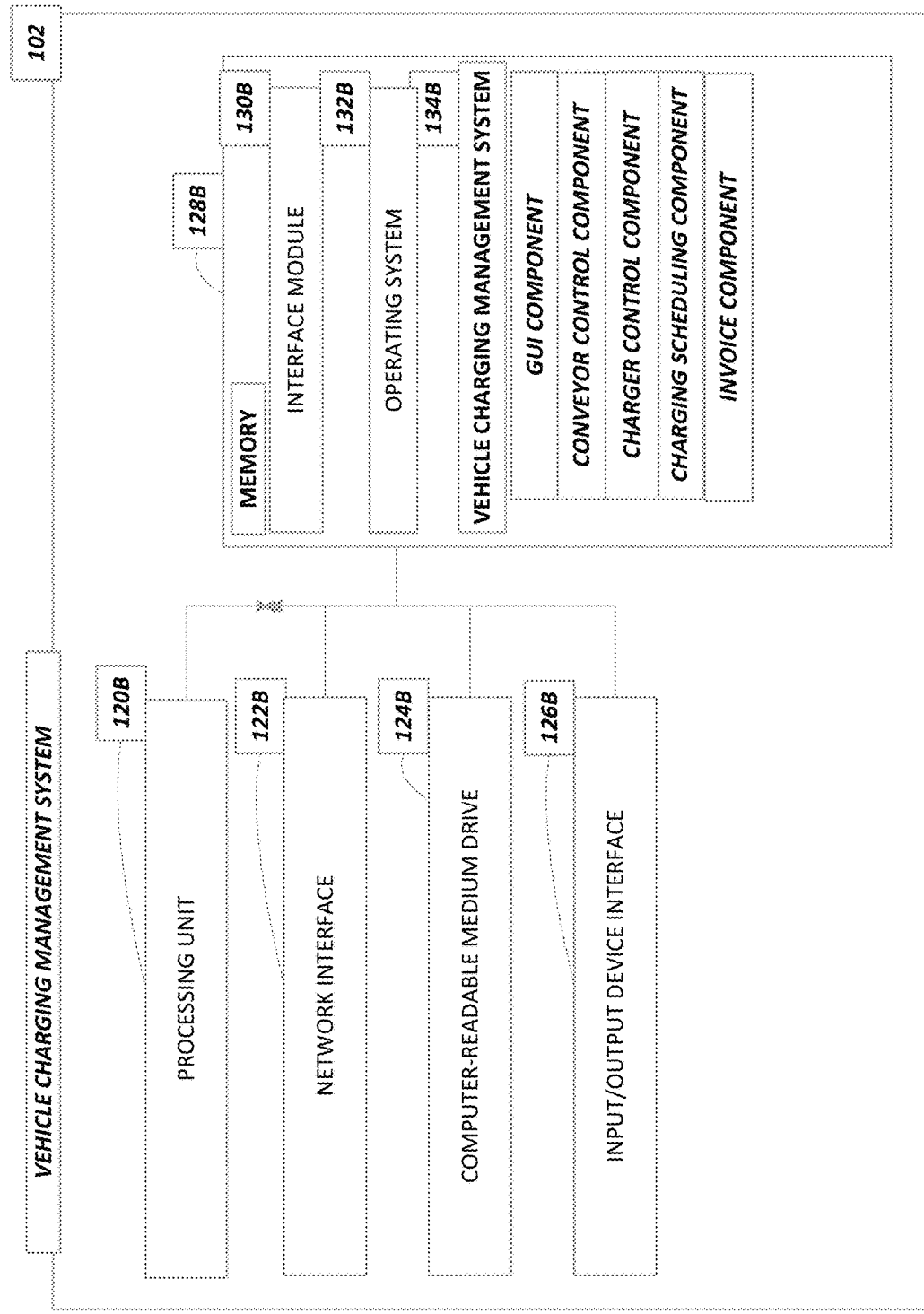
FIG. 1B illustrates an example architecture.

FIG. 1B is a block diagram illustrating an embodiment of example components of the example vehicle charging management system 102. The example vehicle charging management system 102 includes an arrangement of computer hardware and software components that may be used to implement aspects of the present disclosure. Those skilled in the art will appreciate that the example components may include more (or fewer) components than those depicted in FIG. 1B.

The vehicle charging management system 102 may include one or more processing units 120B (e.g., a programmable logic controller (PLC), a general purpose processor and/or a high speed graphics processor with integrated transform, lighting, triangle setup/clipping, and/or rendering engines), one or more network interfaces 122B, a non-transitory computer-readable medium drive 124B, and an input/output device interface 126B, all of which may communicate with one another by way of one or more communication buses. The network interface 122B may provide connectivity to and communications with one or more networks or computing systems (e.g., one or more of the systems and devices illustrated in FIG. 1A). The processing unit 120B may thus communicate information and instructions to and/or from other computing devices, systems, or services via a network. The processing unit 120B may also communicate to and from memory 124B and further provide output information via the input/output device interface 126B. The input/output device interface 126B may also accept input from one or more input devices, such as a keyboard, mouse, digital pen, touch screen, microphone, camera, other sensors, etc.

A programmable logic controller is configured to continuously monitor the state of input devices and makes decisions using a user specified program to control the state of output devices (e.g., energize or de-energize output devices connected to the PLC). For example, the sensor devices may include photoelectric sensors, proximity sensors, limit switches, occupancy detectors, current sensors, voltage sensors, pressure sensors, level sensors, temperature sensors, charge sensors, reed switches, temperature sensors, and/or the like. Output devices may include motors, actuators, solenoids, relays, charging systems, displays, light indicators, audible alarm/indicator systems, printers, and/or the like. The programmable logic controller may include a central processing unit, RAM and ROM/EEPROM, analog inputs (connected to an internal analog to digital convertor), analog outputs (from an internal digital to analog convertor), digital inputs/outputs, and/or the like. The programmable logic controller may be an integrated chip or may comprise one or more interconnected physically separate modules.

The programmable logic controller may be programmed using a Ladder Diagram, Sequential Function Charts, a Function Block Diagram, Structured Text, an Instruction List, and/or other programming techniques.

The memory 128B may store computer program instructions that the processing unit 120B may execute in order to implement one or more aspects of the present disclosure. The memory 120B generally includes RAM, ROM (and variants thereof, such as EEPROM), magnetic disc drives, optical disc drives, and/or other persistent or non-transitory computer-readable storage media. The memory 120B may store an operating system 132B that provides computer program instructions for use by the processing unit 120B in the general administration and operation of the vehicle charging management system 102, including it components. The operating system 132B may be a real time operating system (RTOS).

The memory 128B may store user account data, such as, for a given user, payment instrument data, physical address (which may be the address where the user typically charges the user's vehicle), electronic address(es) (e.g., email address, SMS/MMS address, other messaging service address, etc.), a unique user identifier, a password, one or more unique identifiers associated with the user's vehicle(s) (e.g., an RFID identifier, a license plate number, a VIN, an automatically generated identifier, and/or other identifier), the vehicle make, the vehicle model, the vehicle model year, the vehicle battery capacity, the estimated worst case time to charge the vehicle using regular charging and using fast charging (if so supported by the vehicle), an indication as to whether the vehicle is configured to be fast charged or not, vehicle charging history (e.g., days, times, and amount of charging power), vehicle charge level history when brought in for a charge, and/or other user data. Optionally, in addition or instead, the data may be stored remotely on a cloud-based or other networked data store. The account data may optionally be stored in a relational database, an SQL database, a NOSQL database, a hierarchical database, an object oriented database, a graph database, and/or other database type. Where a user has more than one vehicle, some or all of the vehicle related information discussed above may be stored in the user account for each vehicle.

The memory 128B may include an interface module 130B. The interface module 130B may be configured to facilitate generating one or more interfaces through which a compatible computing device, may send data to, or receive data from the vehicle charging management module 134B.

As will be discussed in greater detail herein, the electric vehicle charging management system 102 may receive a notification over a network from an electrical utility computer system 106 indicating the dates and/or times for which electricity rates will be relatively higher or lower based on actual or estimate electricity demand. The electric vehicle charging management system 102 may use such data from the utility computer system 106 in scheduling vehicle charging.

The modules or components described above may also include additional modules or may be implemented by computing devices that may not be depicted in FIGS. 1A and 1B. For example, although the interface module 130B is identified in FIG. 1B as a single module, the module may be implemented by two or more modules and in a distributed manner. By way of further example, the processing unit 120B may include a PLC and a graphics processing unit (GPU). The system may offload compute-intensive portions of the applications to the GPU, while other code may run on the PLC. The GPU may include hundreds, or thousands of core processors configured to process tasks in parallel. The GPU may include high speed memory dedicated for graphics processing tasks. As another example, the systems described herein and their components can be implemented by network servers, application servers, cloud-base systems, database servers, combinations of the same, or the like, configured to facilitate data transmission to and from data stores, and other party systems via one or more networks. Accordingly, the depictions of the modules are illustrative in nature.

Figure 2A:
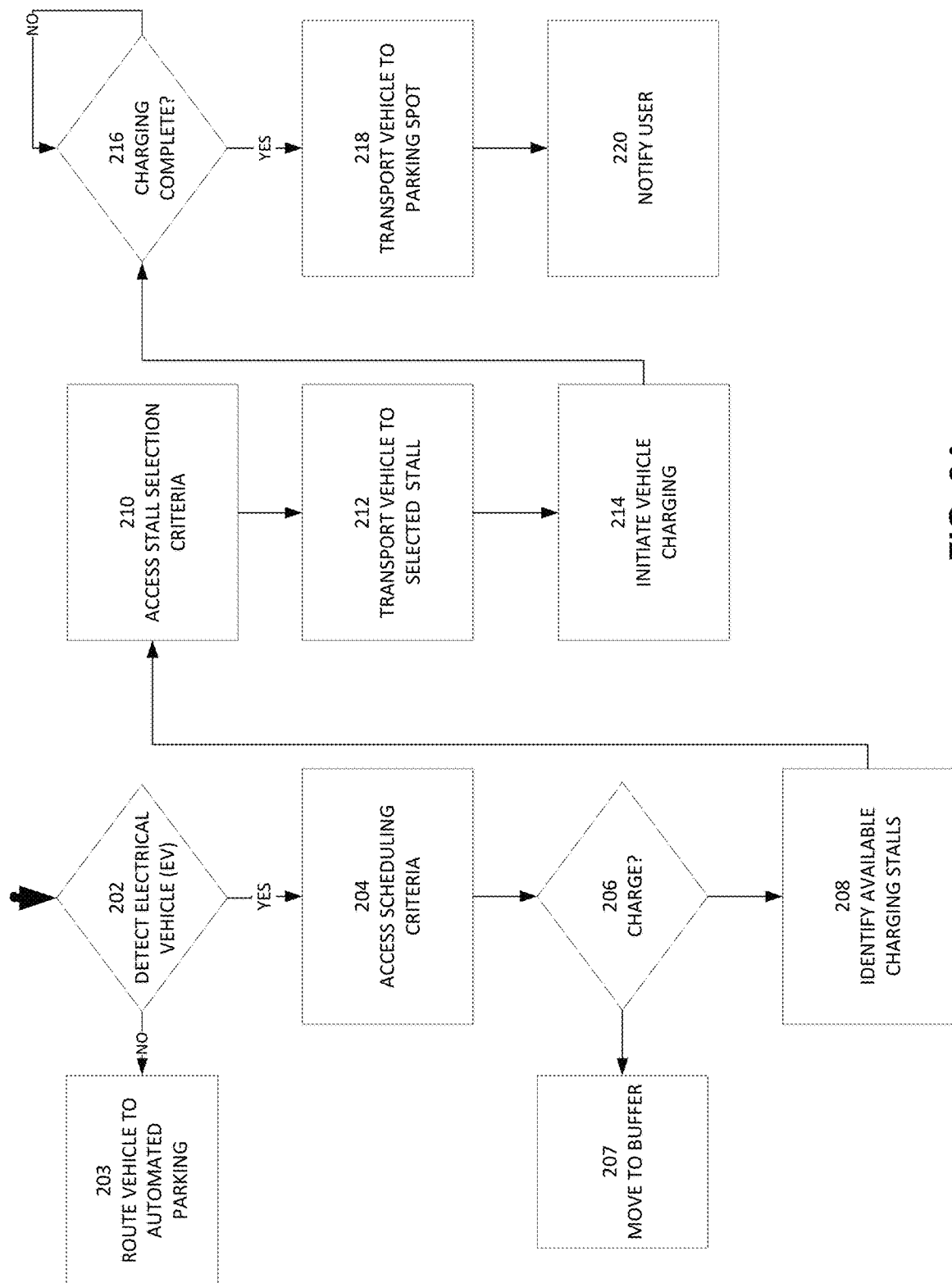
FIGS. 2A-2D illustrates example processes.

FIG. 2A illustrates an example electric vehicle charging process for a parking facility (e.g., a multilevel parking structure) that provides an automated vehicle conveyance system. In the following example, vehicles entering an automated vehicle parking facility (e.g., part of a multiunit living facility, an office building, a manufacturing facility, etc.) may be equipped with devices (e.g., RFID devices, such as passive or active RFID tags located on or within the vehicle) that identify the vehicle (e.g., via a unique vehicle identifier), the user (e.g., via a unique user identifier), that identify the parking facility that the user is authorized to park a vehicle in (e.g., a unique parking facility identifier), and/or that indicate whether the vehicle is an electric vehicle or plug-in hybrid configured for plug-in charging. For example, identification devices may be provided by the parking facility operator to those that have a parking account with the facility.

At block 202, the process (which may be executed in whole or in part using the vehicle charging system 102) may detect that a vehicle has entered an automated parking facility using one or more sensors (e.g., opto-electric sensors, pressure sensors, RFID sensors, cameras, LiDARS (Light Detection and Ranging scanner) or other device that that uses light in the form of a pulsed laser to measure ranges, insertion of a card key into a card key reader, etc.). The process may further detect whether the vehicle is a chargeable electric vehicle (e.g., based on the reading of a RFID device mounted to the vehicle or in a fob carried by the user, based on the reading of a card key inserted into a card key reader, based on a reading of the vehicle license plate which may be used to locate a corresponding account record indicating whether the vehicle is an electric vehicle or not, based on a message initiated from the user's mobile device (e.g., via an application hosted on the user's mobile device), based on a user provided charge request, and/or the like).

If the vehicle or user is not equipped with an RFID tag, key card, or other such device (e.g., because the user is not a tenant or does not have an account with the parking facility operator), the user may be provided with the option to take a parking card provided by a parking card issuing device. The user may be offered a choice of different types of parking cards, a card for simply parking the vehicle, and a card for charging the vehicle (and then parking the vehicle). If the user selects the parking-only card, the process may treat the vehicle the same as a non-electric vehicle regardless of whether or not the vehicle is chargeable. On the other hand, if the user selects the charging card, the vehicle will be treated by the process as an electric, chargeable, vehicle. By way of further example, the user may expressly request that the vehicle be charged via an application (e.g., a dedicated app downloaded from an application store) hosted on a device of the user (e.g., a user phone, wearable, or the vehicle itself).

At least partly in response to detecting that the vehicle is not a chargeable electric vehicle, at block 203, the vehicle may optionally be routed to an automated parking area of the parking facility. The routing may be performed via visual indicators (e.g., illuminated arrows or the like) that guide the user or the vehicle to the parking area and/or by opening a barrier (e.g., a motorized garage door, a motorized parking arm) to a driving path to the parking area (e.g., to a bay via which a conveyor automatically transports the vehicle to a parking spot that does not include a charging station). For example, the non-electric vehicle may proceed to a loading bay having a barrier (e.g., a door or gate). If a pallet is not in the loading bay when the vehicle arrives, the barrier may remain closed and a pallet may be automatically requested by the system. Optionally, the pallet request may specifically request a pallet not configured to be used to charge a vehicle. The requested pallet may then be transported (e.g., via a rail system) from its current location to the loading bay to receive the vehicle. Once the pallet is in the loading bay and ready to receive the vehicle, the barrier may be automatically opened, and the vehicle may be driven onto the pallet.

If, instead, the process determines at block 202 that the vehicle is an electric vehicle, the process may, at block 204, access charging schedule criteria which may be used to determine whether the electric vehicle should be immediately transported to a charging bay, or whether the process should proceed to block 207, and the electric vehicle is to be transported to a buffer holding area (that does not have a charging station), pending later transportation to a charging bay. The charging criteria may include whether there are any charging bays available for charging (e.g., that are not occupied by another vehicle being charged and are not undergoing maintenance), when a charging bay will become available for charging, when the user has indicated the user will need to use the vehicle again, the times of day when the electric utility is charging an increased or decreased amount for electricity, and/or other criteria.

At block 206, using the charging criteria, a determination is made as to whether the vehicle is to be immediately transported to a charging area or is to be first transported to a holding area for later transportation to the charging bay. In addition, a barrier (e.g., a motorized garage door, a motorized parking arm, and/or the like) may be opened enabling the user to drive the vehicle (or the vehicle to drive itself if the vehicle is accordingly configured) onto a pallet located in a transportation loading bay. If a pallet is not in the loading bay when the vehicle arrives (or if the pallet does not include patch cables for vehicle charging or is otherwise not configured to be used to charge a vehicle), the barrier may remain closed and a pallet configured to be used to charge a vehicle (e.g., where the pallet includes one or more patch cables for vehicle charging) may be automatically requested by the system. The requested pallet may then be transported (e.g., via a rail system) from its current location to the loading bay to receive the vehicle. Once the pallet is in the loading bay and ready to receive the vehicle, the barrier may be automatically opened, and the vehicle may be driven onto the pallet.

The user may be visually and/or audibly prompted (e.g., via a computer controlled display, a static sign, or speaker) to plug the vehicle into a charging cable (sometimes referred to herein as a patch cable) coupled to the pallet (where the charging cable may not yet be connected to a charging station). The pallet may then be lifted onto a rail system enabling the pallet to roll thereon and configured to transport the pallet with the vehicle thereon to a desired location. Optionally, if the vehicle is determined to be a wirelessly chargeable vehicle and the charging system is equipped to wirelessly charge vehicles, no such prompt to plug in a cable is provided.

Optionally, to enhance safety, the process may sense whether the loading bay door is closed or open, and that the user has exited the vehicle and/or exited the loading bay (e.g., using one or more presence detectors, such as a laser that scans the loading bay floor, an infrared motion sensor that detects heat, an ultrasonic rangefinder sensor, a camera, a millimeter wave radar, using an exit door sensor, and/or the like) prior to transporting the vehicle to the buffer area or to a charging stall in the charging bay. Movement of the pallet bearing the vehicle may be inhibited until it is determined that the door is closed, and the user is not present in the loading bay.

Other safety features may be provided. For example, if a sensor is detected to have failed (e.g., based on a failure to receive a sensor signal, or in response to detecting a sensor voltage or current outside of a specified range), movement of the pallet bearing the vehicle may be inhibited. Optionally, to yet further enhance safety, a local safety circuit may detect the failure of a bay door to close, the presence of a user in the bay, and/or a sensor failure, and may prevent movement of the pallet bearing the vehicle accordingly, overriding any commands from the vehicle charging management system. Optionally, visual and/or audible notification/warning (e.g., a recorded or synthesized voice and/or a beeping or siren sound) may be presented to the user instructing the user to leave the bay after detecting that the vehicle has been driven onto the pallet.

Optionally, instead of routing electric vehicles to different areas, both electric vehicle and non-electric vehicles may proceed to the same loading bay (or set of loading bays) to be transported via a pallet. A non-electric vehicle (or optionally an electric vehicle that is not to be charged) may be transported via a pallet that is not configured with a patch cable for vehicle charging or may optionally be transported via a pallet that is configured with a patch cable for vehicle charging (even if such patch cable will not be used to charge the non-electric vehicle). However, if an electric vehicle that is to be charged reaches the loading bay and the pallet in the bay is not configured with a patch cable (or other charging interface) so as to be able to be used to charge the vehicle, the transportation barrier may remain closed, and the current pallet that is not equipped with a patch cable will be transported out of the loading bay, and a different pallet, equipped with a patch cable (or other charging interface), will be transported into the loading bay. Once the pallet equipped with a patch cable is in the loading bay and ready to receive the electric vehicle, the loading bay barrier may be raised and the electric vehicle may then drive onto the pallet with the patch cable to be transported as described herein.

If a determination is made that the vehicle is to be moved to the buffer area, and that it is safe to do so (e.g., the user is no longer in the loading bay), at block 207 the vehicle is transported via the pallet to the buffer area. If a determination is made that the vehicle is to be moved to the charging bay, at block 208, a determination may be made as to which charging stalls in the charging bay (or charging bays if there are more than one) are available. At block 210, stall selection criteria may be accessed. For example, the stall selection criteria may indicate that an available stall equipped with a fast charger should be selected if the vehicle is configured to be fast charged, or that a standard charger should be selected if the vehicle does not support fast charging or if the user indicated that the vehicle will not be needed by the user for at least a threshold period of time (e.g., 4 hours, 8 hours, 12 hours of other threshold period of time). By way of further example, stall selection criteria may indicate that the lowest or highest level of the structure at which an appropriate charging stall is available should be selected.

At block 212, a charging stall may be selected based on the stall availability and the stall section criteria, and the vehicle may be transported to the selected charging stall by moving the pallet to the charging stall (e.g., using a lift and shuttle system as described elsewhere herein). For example, the pallet may be positioned over a coupler having contacts that engage contacts on the pallet (e.g., positioned on one or more sides of the pallet, such as a vertical wall of the pallet, the top of the pallet, or the bottom of the pallet) in the charging stall. The coupler contacts may be used to supply power to, and signaling and communications to and/or from the pallet. A low voltage, low current (e.g., 24 VDC) power source may be provided to via the coupler to the pallet to enable a safe continuity check to be performed and to ensure that the patch cable is plugged into the vehicle. If the continuity check passes (e.g., continuity is detected), at block 214 the vehicle charging may be performed at a higher voltage (e.g., 240 volts). If the continuity check fails, the pallet, with the vehicle thereon, may be transported out of the charging stall and to a parking stall or to a holding area where a service person may optionally manually plug in the patch cable into the vehicle and/or determine why the continuity check failed.

At block 214, vehicle charging may be initiated, where power is conveyed via charging cables from the charging station to the vehicle positioned on the pallet. Optionally, for safety, a determination may be made as to whether anyone is present in the charging stall prior to charging (e.g., using presence detection sensors such as discussed elsewhere herein), and charging may be inhibited until a determination is made that no one is present in the stall. In such configuration, charging may be initiated partly in response to determining that no one is present in the charging stall.

At block 216, signaling from the vehicle (e.g., received via the charging cable) may be monitored to determine if a charge complete signal has been received. Charging may continue until the charge complete signal is received from the vehicle or until the user requests the vehicle.

At block 218, once charging is complete (or the user has requested the vehicle), the pallet (with the vehicle thereon) may be transported to a parking stall, and the vehicle may be lifted to and then positioned on the parking stall for storage until the user requests the vehicle (unless the user has requested the vehicle, in which case the vehicle may be transported to an exit area). For example, a lift may be utilized to lift the vehicle and pallet, move the vehicle and pallet to and above the parking stall, and then lower the vehicle and pallet onto the parking stall. Optionally, for safety, a determination may be made as to whether anyone is present in the charging stall prior to moving the pallet (e.g., using presence detection sensors such as discussed elsewhere herein), and such pallet movement may be inhibited until a determination is made that no one is present in the stall. In such configuration, pallet transportation may begin only after determining that no one is present in the charging stall.

At block 220, once charging is complete, a notification is optionally transmitted to the user (e.g., via a messaging service message, an email message, a phone application pop-up notification, a display in the user's office or residence, or other otherwise) notifying the user that charging of the user's vehicle is complete.

The charging process may be made further efficient by individually metering each electric vehicle being charged for electricity usage. The electricity usage may be used to determine how much is owed by a given electric vehicle owner, and the electric vehicle owner may be accordingly invoiced. Optionally, the owner may have a payment instrument (e.g., a credit card, a debit card, a bank account number, etc.) stored in their account which may be automatically used to pay for the electricity usage. Optionally, the electricity usage may be provided to another entity (e.g., the operator of the parking structure), who may then translate the electricity usage into a currency amount, and may then invoice the vehicle owner.

Optionally, in order to reduce electricity costs and to reduce demand on the electric utility resources, the electric vehicle charging management system may schedule vehicle charging to be performed during times of day when electricity costs are relatively lower, and avoid charging vehicles during times of day when electricity costs are relatively higher. As similarly discussed above, the electric vehicle charging management system may receive a message over a network from an electrical utility computer system indicating the dates and/or times for which electricity rates will be relatively higher or lower based on actual or estimate electricity demand. Thus, for example, if an electric vehicle user indicates that the user will not be using the vehicle for the next 18 hours, the electric vehicle charging management system may schedule the charging of the vehicle to a time period within the 18 hours that has a relatively lower electricity rate.

Figure 2B:
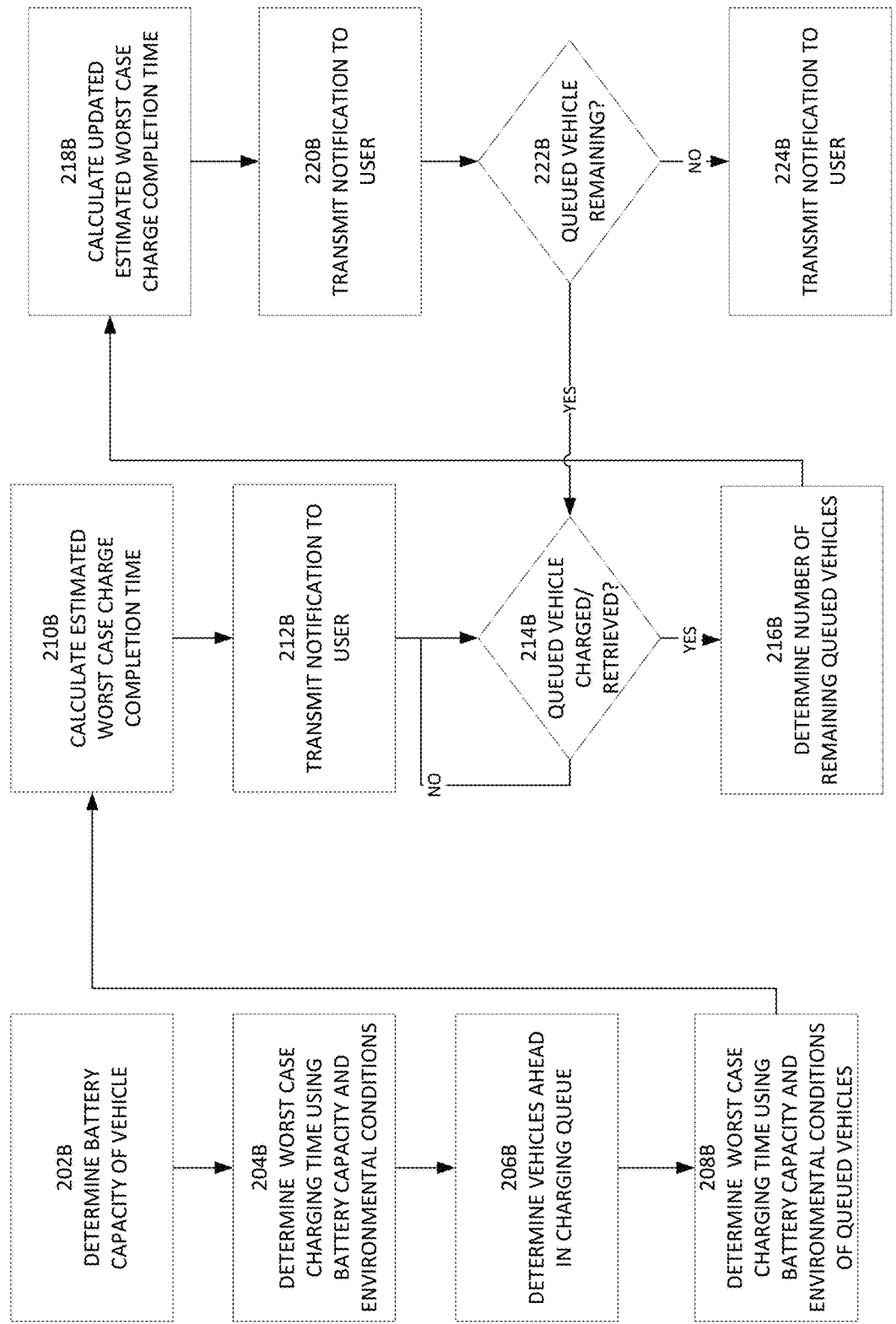

FIG. 2B illustrates an example process for estimating vehicle charging time and generating corresponding notifications. Optionally, a user may specify, via a user interface, what type of notifications the user wants to receive. For example, the user may specify that the user wants to (or does not want to) receive a notification each time the user's vehicle moves up a position in a charge queue, when the user's vehicle has begun charging, when the user's vehicle has completed charging, and/or when the user's vehicle has been parked. The following process may access such user notification specification and transmit notifications accordingly.

At block 202B, a battery capacity of a given vehicle to be charged may be determined. For example, the battery capacity may be determined from information in a user account associated with the given vehicle. The user account may be accessed as similarly discussed with respect to FIG. 2A (e.g., using a vehicle identifier scanned from a vehicle RFID tag and/or using a vehicle license plate number captured using a camera). The user account may explicitly store data on the battery capacity and/or maximum charge time(s) (for respective charging station delivery rates), and/or the user account may include the vehicle make, model, and model year data, which may then be used to lookup the battery capacity and/or maximum charge time (assuming the vehicle battery is completely or nearly completely depleted) from a lookup table or other data source.

At block 204B, the worst-case charging time for the given vehicle may be determined for a regular and/or fast charging operation using the determined battery and/or maximum charge time determined at block 202B and current or predicted environmental conditions (e.g., the ambient temperature of the charging bay). For example, cold and/or hot temperature extremes may add to vehicle charge time. Optionally, the worst-case charging time may assume the given vehicle is at certain percentage of full charge (e.g., 10%, 20%, or other percentage) which may be a static percentage or may be based on historical data for the user's vehicle when brought in to charge (e.g., the average charge level when the vehicle was brought in for a charge over a period of time (e.g., the last week or last 4 weeks), the average of the three (or other number) lowest charge levels over a period of time, or the lowest charge level detected over a period of time, such as the past month).

At block 206B, the number of vehicles ahead of the given vehicle in a charge queue may be determined. For example, if there are no available charging stalls available when a vehicle is to be charged, the vehicle may be placed in a logical charge queue and temporarily physically stored in a buffer area (as similarly discussed elsewhere herein). Of course, in some scenarios, there may be no vehicles in a charge queue and there may be an available charging bay immediately ready to charge the given vehicle.

At block 208B, the total worst-case charging time for the queued vehicles may be determined for a regular and/or fast charging operation using the determined battery and/or maximum charge time determined for each of the queued vehicles at block 204B and current or predicted environmental conditions (e.g., the ambient temperature of the charging bay). The total worst-case charging time for each of the queued vehicles may then be summed together and divided by the number of charging bays to generate an estimated time to complete charging the queued vehicles.

At block 210B, the estimated time to complete charging the queued vehicles and the estimated time to complete charging the given vehicle may be summed to generate an estimate worst case charging completion time for the given vehicle. Such completion time may be expressed in hours, minutes, and/or seconds, and added to the current time of day to determine the time of day the given vehicle will be fully charged. In addition, with respect to vehicles currently being charged, the amount of time such vehicles have been charged may be used to estimate the remaining charging time. Such time estimate may be used to enhance the accuracy of the estimated time to complete charging the queued vehicles, and hence the accuracy of the estimated time to complete charging the given vehicle.

At block 212B, a notification may be transmitted to the user associated with the given vehicle. The notification may include the number of vehicles ahead of the given vehicle in the charge queue ("you are number 7 in the vehicle charge queue"), the estimated time it will take until the given vehicle is fully charged (e.g., expressed in hours and/or minutes), and/or the time of day at which it is estimated the given vehicle will be fully charged (e.g., 5:30 PM). By way of illustration, the message may be transmitted as a short messaging service message (e.g., SMS, MMS, etc.), an instant message, an email, a push notification, an audible notification, a pop-up interface, and/or otherwise.

Update notifications may be transmitted on the user in response to one or more events. For example, at block 214B, the process may monitor when a previously queued vehicle has completed charging (or when the user of the previously queued vehicle has requested the vehicle prior to charge completion). If it is determined that a previously queued vehicle has completed being charged or the user has retrieved the previously queued vehicle, the number of vehicles awaiting charge and/or awaiting charge completion is determined. At block 218B, the current the number of vehicles awaiting charge and/or awaiting charge completion is used to re-calculate the estimated worst case charge completion time for the given vehicle, and at 220B, the notification transmitted at block 212B is updated with the new charge completion time estimate and charge queue position, and transmitted to the user.

At block 222B, a determination is made as to whether there are vehicles remaining ahead of the given vehicle in the queue. If there are vehicles remaining ahead of the given vehicle in the queue, the process may proceed back to block 214B. If there are no vehicles remaining ahead of the given vehicle in the queue, the process may proceed to block 224B, and a notification may be transmitted to the user that the user's vehicle is being charged. The process may detect when the given vehicle is fully charged, and may transmit a corresponding charge notification to the user. The process may detect when the given vehicle is parked, and may transmit a corresponding parking notification to the user.

Optionally, rather than using worst case charge times (e.g., that assumes the electric vehicles charge states are at or near zero when brought in for charging) in estimating charge completion times in the foregoing processes, the actual charge state of some or all of the electric vehicles being brought in for charging may be used. For example, although some electric vehicles may not be configured to report its actual charge state to an electric vehicle charge station (other than to indicate that it is fully charged/charging has been completed), other electric vehicles may be configured to report their actual charge state to an electric vehicle charge station, in which case the actual initial charge state of the corresponding vehicle may be used in estimating the charge time for that vehicle in the foregoing process (and hence the charge completion time for other electric vehicles behind it in the queue).

Optionally, even if an electric vehicle is not configured to report its actual charge state to an electric vehicle charge station, an interface may be provided via which a user can manually provide the actual charge state of the user's electric vehicle when brought in for charging. The user interface may be provided via an application downloaded to a user device, via terminal at the loading bay, or otherwise. If the user does provide the actual charge state, the actual initial charge state of the user's electric vehicle may be used in estimating the charge time for that vehicle in the foregoing process (and hence the charge completion time for other electric vehicles behind it in the queue), rather than using a worst case estimate that, for example, may assume the vehicle charge is at or near zero when brought in for charging.

Figure 2C:
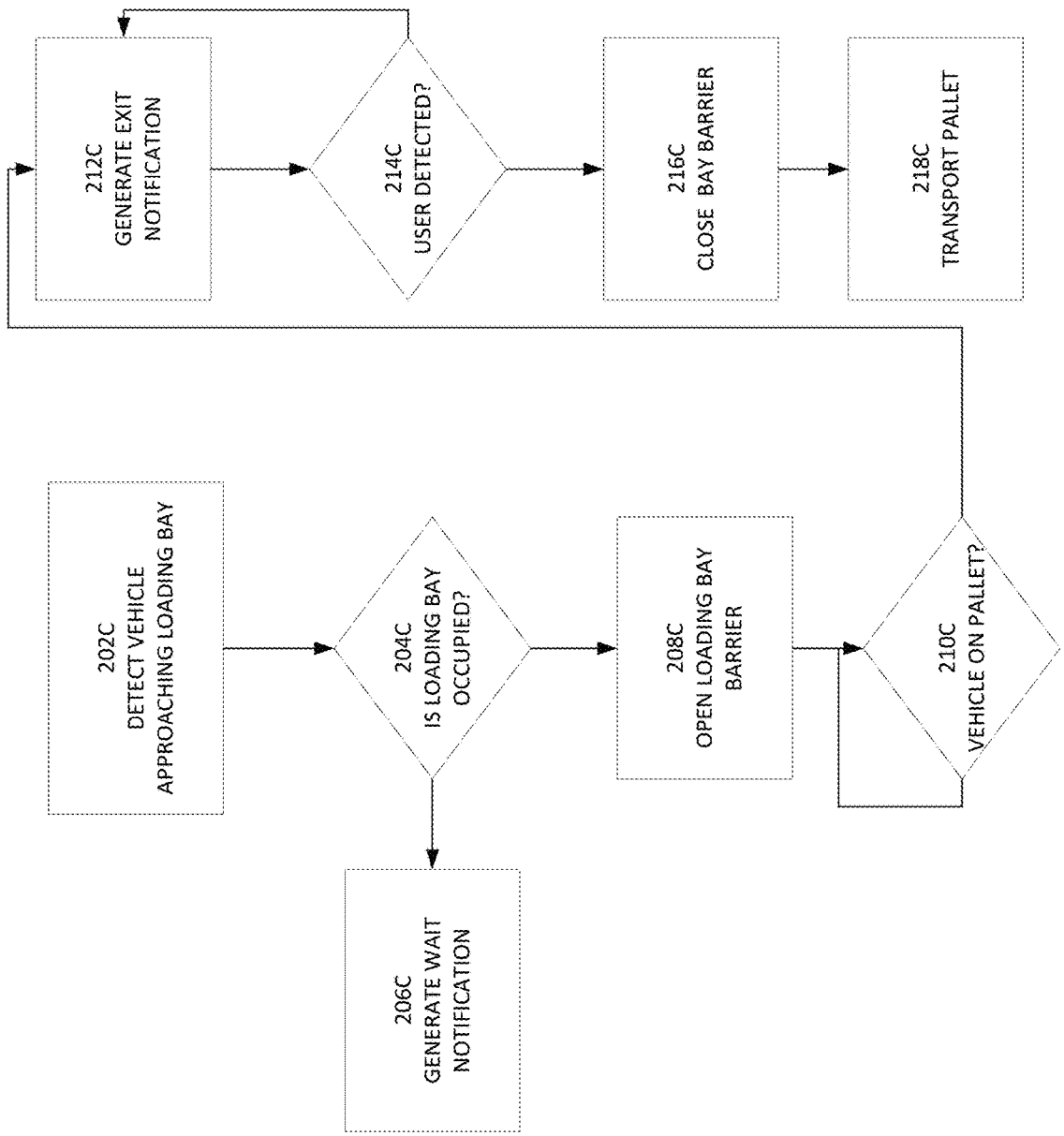

FIG. 2C illustrates an example process for managing a vehicle loading bay equipped with a transportable pallet as described elsewhere herein. The bay may be a walled area that is only accessible to users (e.g., vehicle operators that want to have their vehicle charged) via a vehicle entry passage (which may be sealable via a barrier such as a section, roll-up/roll-down garage-type door), wherein users may exit the loading bay via one or more human-sized exit doors. The loading bay may optionally be configured or sized to only accept one user vehicle at a time.

At block 202C, the process detects that a vehicle is approaching or has reached the loading bay barrier (e.g., a garage door or the like). For example, an RFID reader, a pressure sensor, and/or opto-electric sensor may sense that the vehicle has reached a certain proximity position with respect to the garage door.

At block 204C, the process may detect whether the loading bay is already occupied by one or more vehicles (e.g., using one or more vehicle presence detection sensors, such as a laser sensor, a pressure sensor, a strain gauge, an ultrasonic rangefinder sensor, a camera, a millimeter wave radar, and/or the like). If the loading bay is already occupied, at block 206C, a wait notification may be presented via a visual and/or audio indicator (e.g., comprising an indicator LED light, a pixel addressable display (e.g., and LCD display, an OLED display, an E-ink display) and/or the like), and/or a speaker).

If the loading bay is not occupied and is ready to receive the vehicle, at block 208C, the loading barrier is opened (e.g., raised, moved sideways, lowered, etc.) to permit entry of the vehicle, wherein the vehicle can be driven onto the loading bay pall. At block 210C, a determination is made as to whether the vehicle has been driven onto the pallet. Such determination may be made using one or more sensors, such as a laser sensor, a pressure sensor, a strain gauge, an ultrasonic rangefinder sensor, a camera, a millimeter wave radar, and/or the like. In addition, the user may be prompted to insert a charging cable coupled to the pallet into a charge port of the vehicle. A determination may be made as to whether the user has accordingly inserted the charging cable coupled to the pallet into the charge port of the vehicle, and an indication may be provided to the user when the user has successfully inserted the charging cable into the charge port.

If a determination is made that the vehicle has been driven onto the pallet, at block 212C, an exit notification is provided to the user (e.g., using one or more display devices described elsewhere herein and/or a speaker device) instructing the user to exit the loading bay. The notification may be continuously provided until the user leaves the loading bay (e.g., a voice instruction may be repeatedly provided, such as "please leave the loading bay). Optionally, if the user does not leave the loading bay within a predetermined threshold amount of time, a notification may be transmitted to and presented to support personnel (e.g., via a display, an alert light, a speaker, an email, a short messaging service, etc.) who may investigate and resolve the issue and cause the user to exit the loading bay.

In order to ensure safe operation of the loading bay, at block 214C, the process detects whether the user is still present the loading bay using one or more sensors such as a laser that scans the loading bay floor, an infrared motion sensor that detects heat, an ultrasonic rangefinder sensor, a camera, using a millimeter wave radar, using an exit door sensor, and/or the like.

In response to detecting that the user is no longer present, at block 216C, the loading bay barrier is closed. Optionally, the loading bay barrier is closed instead as soon as the vehicle is sensed on the pallet. At block 218C, the pallet may be transported to a charging stall equipped with a charging station as described elsewhere herein. Optionally, the same or a different loading bay barrier (e.g., a garage door) may first be opened to enable transportation of the pallet and vehicle to the charging stall.

Figure 3A:
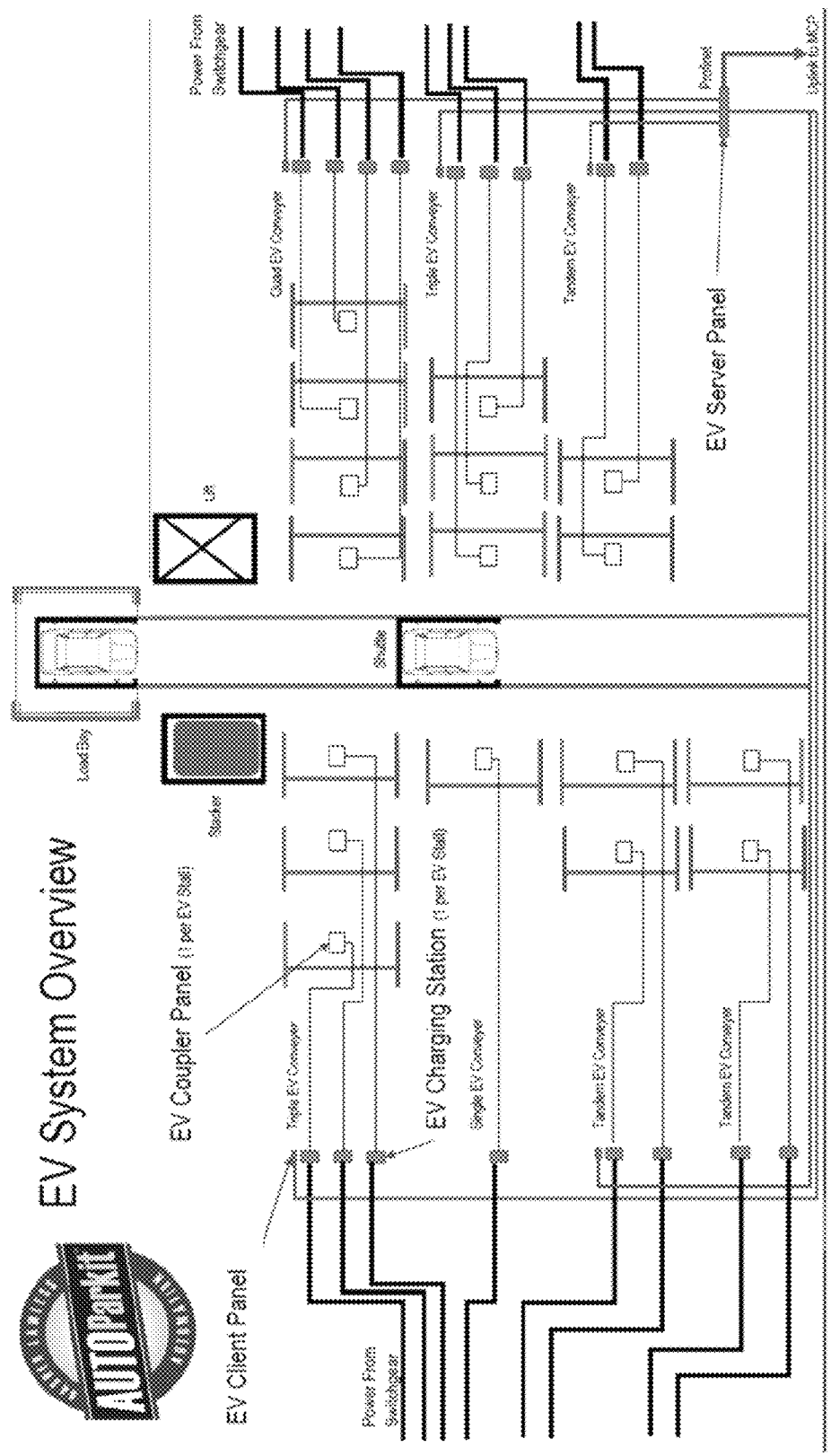
FIGS. 3A-3F illustrate various aspects of an example electric vehicle transport and charging system.

Referring now to FIG. 3A, an example electric vehicle charging system configuration is illustrated. The system may be configured with a mix of different conveyor sizes configured to convey pallets bearing different numbers of vehicles, and with a corresponding mix of different numbers of charging stations.

For example, the vehicle charging system may be configured with one or more quad electric vehicle conveyors, one or more triple electric vehicle conveyors, one or more dual/tandem electric vehicle conveyors, and/or one or more single electric vehicle conveyors. Thus, the system may be configured with an X-sized electric vehicle conveyor (where "X" may vary from 1-5 vehicles or other number) configured to transport a pallet sized to carry "X" vehicles, and with a corresponding set of "X" electric vehicle charge stations (which receive power from power switchgear), and a corresponding number of "X" stalls (wherein a given stall have an electric vehicle coupler panel configured to connect an electric vehicle to the charging station). The electric vehicle charge stations may be capable of charging electric vehicles with various different battery technologies (e.g., lithium ion, nickel hydride, solid state silver-carbon, lead acid, etc.).

An electric vehicle client panel may be located at each set of "X" stalls, where a client panel may be used to provide remote signal wiring and distribute and power to multiple couplers respectively positioned at multiple electric vehicle charging stalls. Thus, the user of a client panel reduces the amount of wiring that would otherwise be needed if each bay needed to have its own control panel, where each control panel would need power and signal wiring. Multiple client panels may in turn be connected to a shared electric vehicle server panel, which may provide an uplink to a main control panel (MCP) (which may service multiple electric vehicle server panels).

As illustrated in FIG. 3A, a vehicle loading bay is provided, and a shuttle system is used to convey the pallet (bearing a vehicle) in a horizontal plane to a desired location. A lift may be provided to transport a vehicle (and optionally the pallet used to convey the vehicle) vertically (e.g., to a different parking structure level). A stacker may be provided to stack vehicles.

Figure 3B:
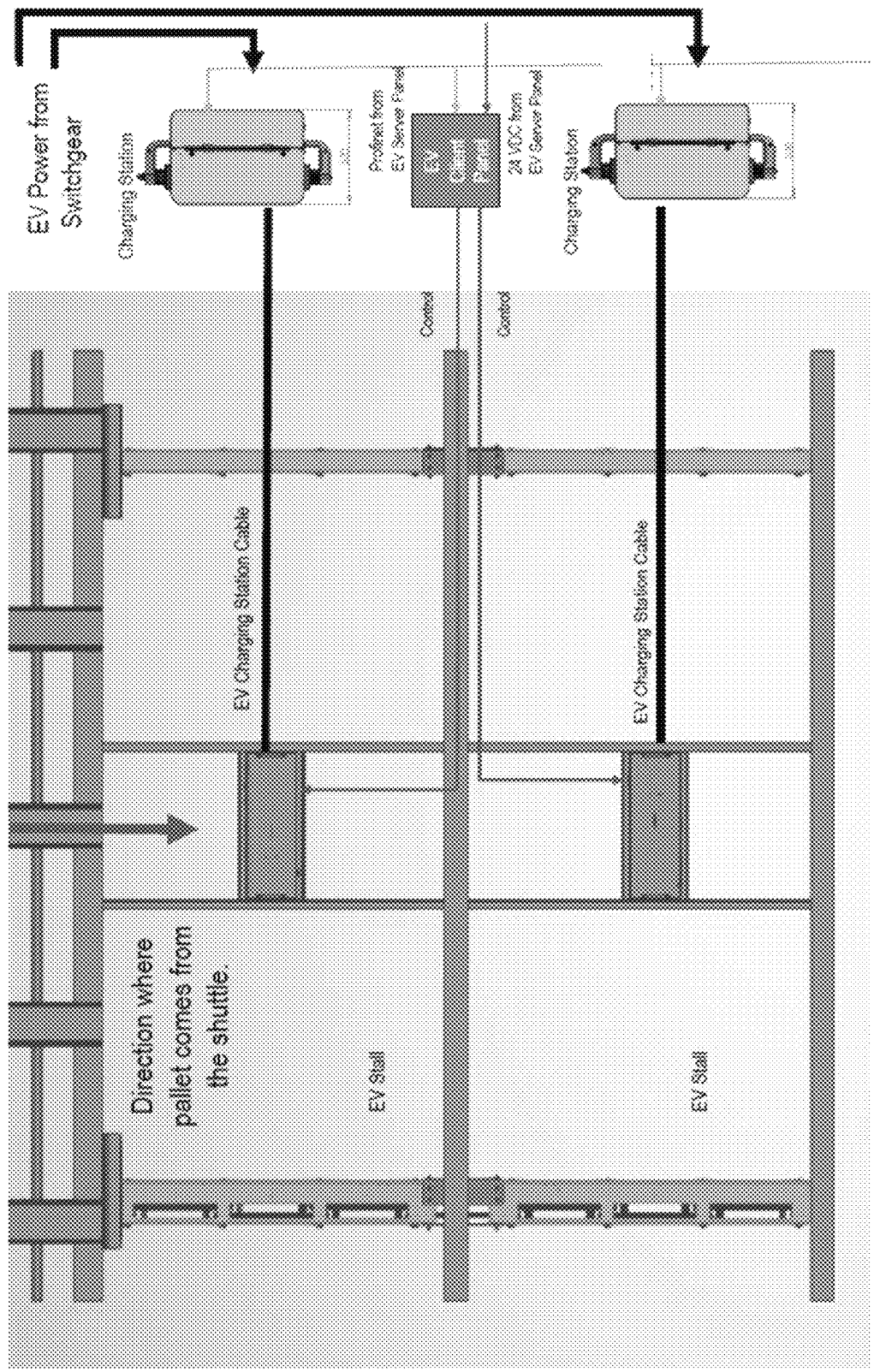

Referring to FIG. 3B, electric vehicle stalls (including coupler panels), charging station cables, charging stations, client panels, and shuttle are illustrated in greater detail.

Figure 3C:
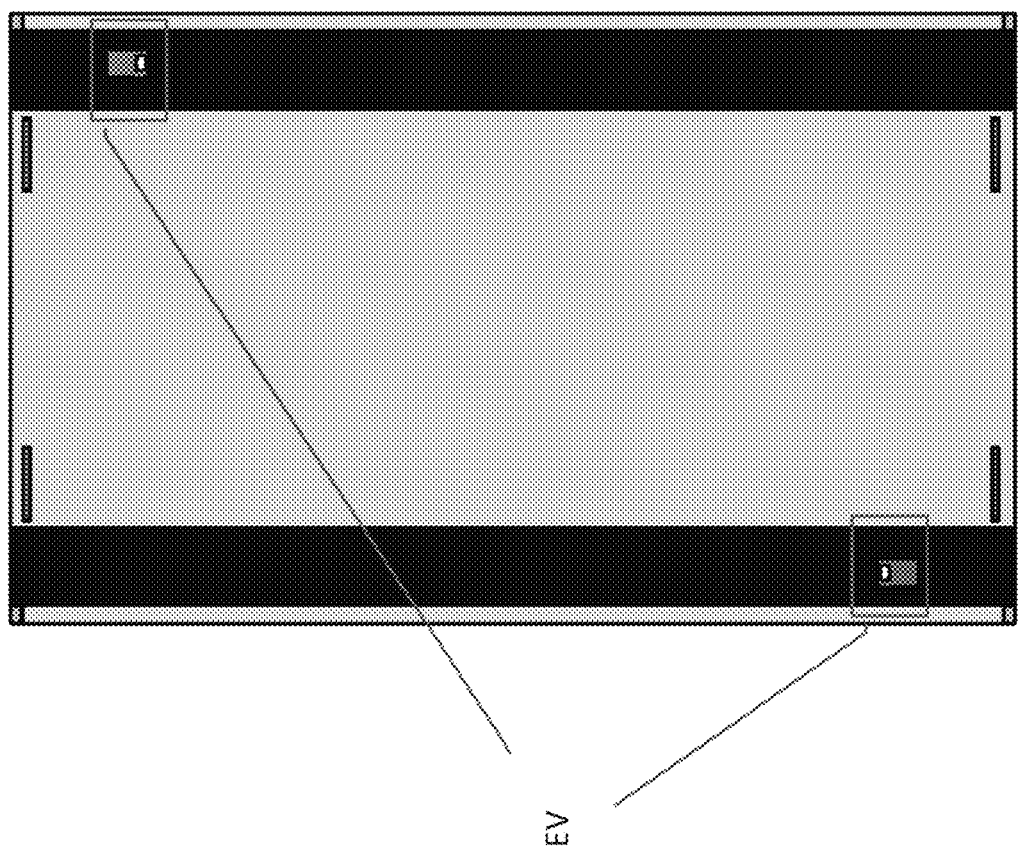

As discussed herein, electric vehicles may be transported via pallets to charging stations at electric under control of an electric vehicle charging management system. Referring now to FIG. 3C, an example charging pallet is illustrated. By way of example, the pallet (and the charging cable(s) coupled thereto) may support Level I, Level II, and/or DC Fast Charging of electric vehicles.

Figure 3D:
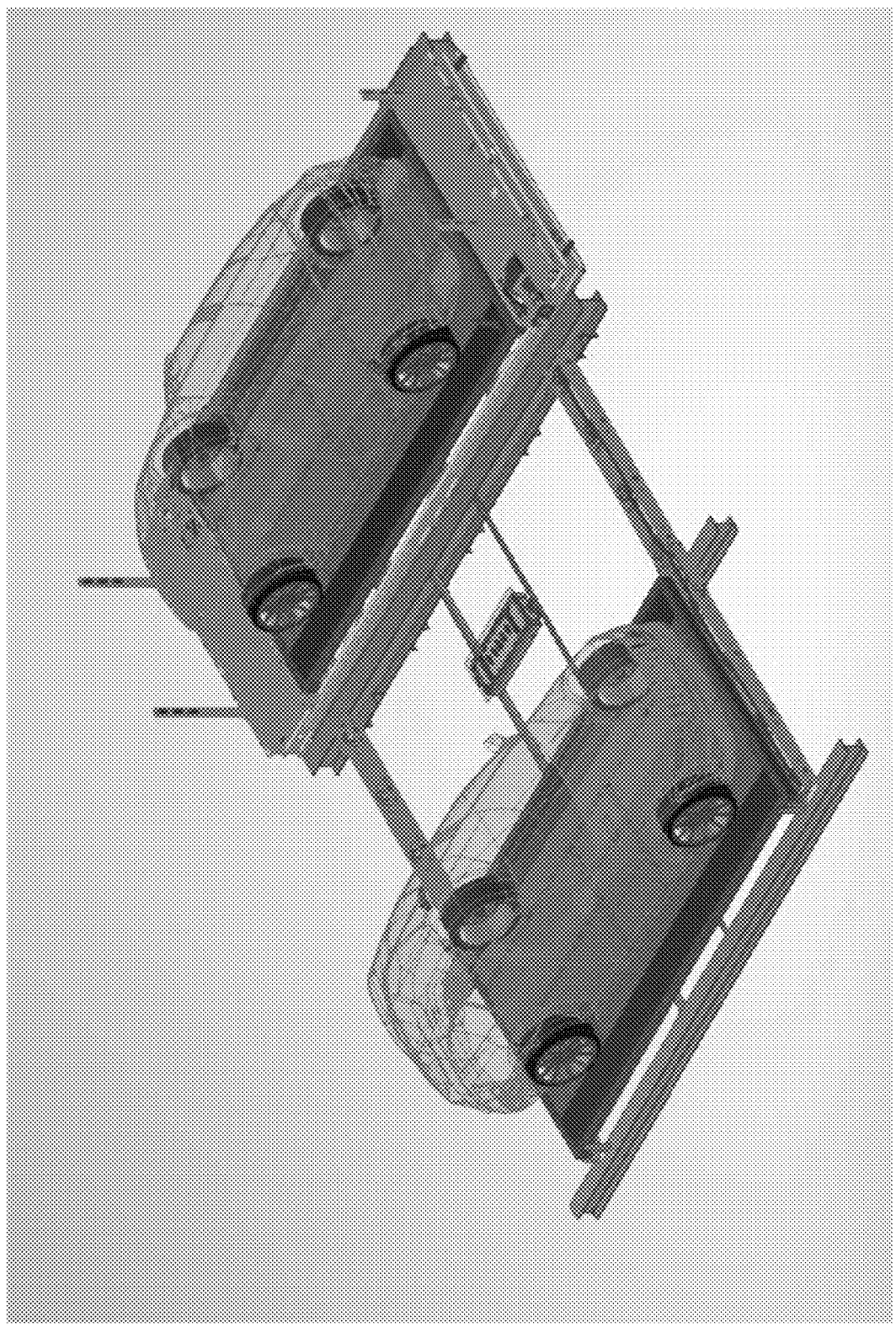
Figure 3E:
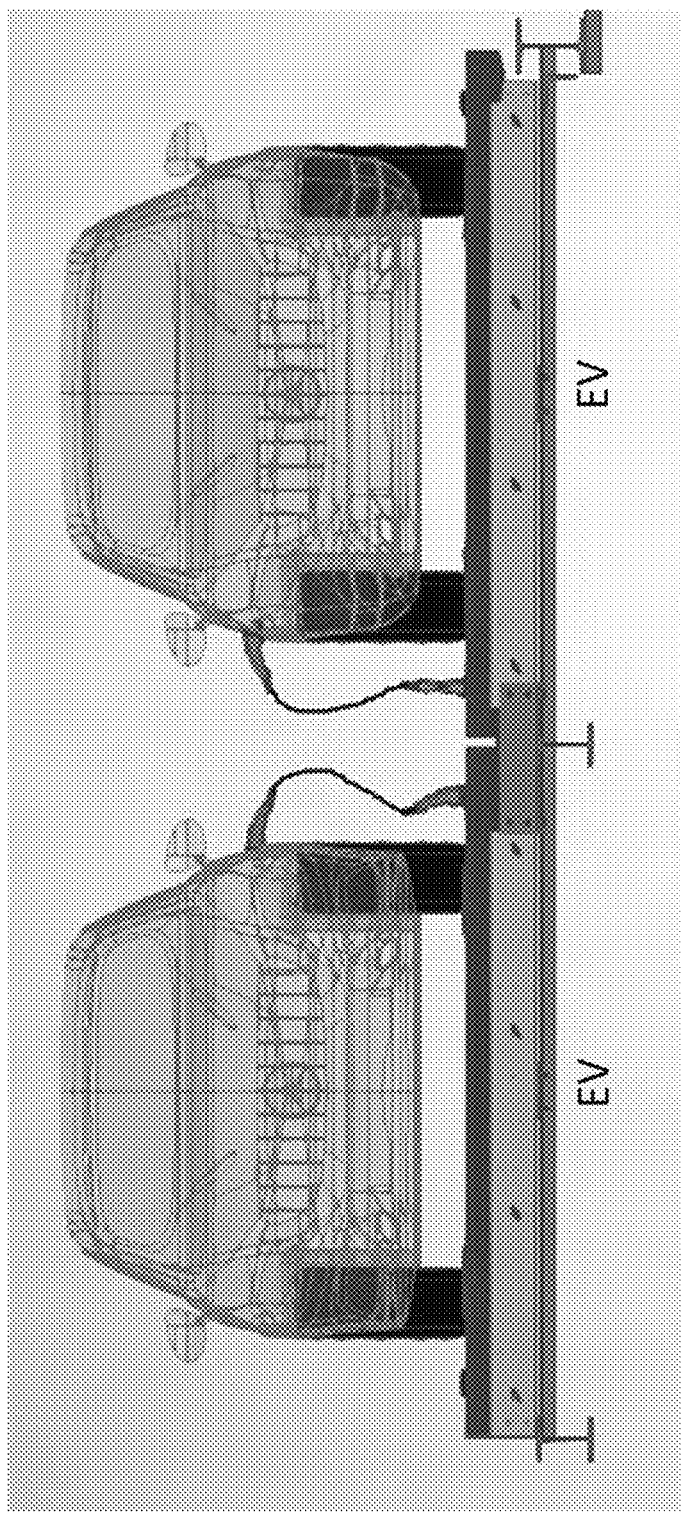

A charging pallet may be sized to receive one electric vehicle or more than one electric vehicle (see, e.g., FIG. 3E). Optionally, as discussed elsewhere herein, a parking facility may be equipped with charging pallets of different sizes to accommodate different numbers of vehicles and/or different sizes of vehicles. For example, certain pallets may be sized to receive mid-sized SUVs or smaller (e.g., with a length less than 205 inches and a width less than 80 inches), and other pallets may be size to receive full size pickup trucks (e.g., with a length less than 250 inches and a width less than 85 inches).

A user or parking attendant (or the vehicle itself if it has adequate self-driving capabilities) may drive the electric vehicle onto a pallet (e.g., at a pallet loading bay) or the pallet may be positioned beneath the car when parked. The pallet may include a charging cable (sometimes referred to herein as a patch cable) having a plug on a first end configured to mate with a vehicle receptacle (sometimes referred to herein as a port) which a user may plug into the vehicle. For example, the plug may be an AC (alternating current) plug. By way of further example, the plug may be Type 1 single-phase plug enabling a vehicle to be charged at up to 7.4 kW, depending on the charging power of the vehicle and power grid capability. The plug may be a Type 2 triple-phase plugs enabling a vehicle to be charged at a power rate of 22 kW or up to 43 kW, depending on the charging power of the vehicle and power grid capability.

Optionally, in addition or instead of utilizing AC plugs, a given pallet may be equipped with a DC (direct current) plug. For example, the plug may be a CHAdeMO compliant plug, which provides for high charging capacities of up to 100 kW and bidirectional charging. The plug may be a CCS compliant plug (which supports AC and DC charging), which is an enhanced version of the type 2 plug, with two additional power contacts that enable quick charging of up to 350 kW.

Optionally, the pallet may include multiple patch cable-receiving sockets and optionally multiple associated patch cables. For example, different vehicles (e.g., different makes and/or models of vehicles) may have their charging socket located at different positions. By way of illustration, a charging socket may be located on the left side of the vehicle towards the rear, the left side of the vehicle towards the front, the right side of the vehicle towards the rear, the right side of the vehicle towards the front, and/or the front of the vehicle or the rear of the vehicle. Optionally, two patch cable-receiving sockets may be provided, located at or near diagonally opposite corners of the pallet (see, e.g., the EV patch cable-receiving sockets illustrated in FIG. 3C). Thus, the pallet may include patch cables and/or patch cable receptacles positioned so that the patch cable is not longer than a threshold length (e.g., no greater than 8 feet, such as 3 feet, 4 feet, 5 feet, 6 feet, 7 feet, or 8 feet) so as to enhance safety, reduce voltage drop and power loss, and make patch cable management and storage easier. Further, because the pallet may or may not be rotated 180 degrees from a nominal orientation when in the loading bay (as described elsewhere herein), having cable-receiving sockets located at or near diagonally opposite corners of the pallet will ensure that a patch cable will be properly positioned regardless of whether the pallet is or is not rotated 180 degrees from the nominal orientation.

The charging patch cable may include a plug on the second side that mates with a receiving receptacle (e.g., a socket) on the pallet to enable the charging cable to be easily removed from the pallet (e.g., for maintenance or repair).

To further enhance safety, the pallet, and hence the vehicle, is not connected to the charging station power source when the user plugs the charging patch cable into the vehicle or while the vehicle is being conveyed to the charging station located at a charging stall. However, advantageously, once the patch cable is plugged into the vehicle, the vehicle still provides a positive confirmation indication that the patch cable is plugged into the vehicle (e.g., a ring around the vehicle charging receptacle or other such indicator light may illuminate, and/or an audible sound may be generated).

The pallet may include a contact plate (see, e.g., FIG. 3G) on a side (e.g., the bottom-side) of the pallet. Optionally, the contact plate may be positioned at approximately the center area of the bottom of the pallet. The contact plate may have contacts connected via wiring to one or more patch cable receptacles (e.g., sockets) on the pallet. In addition, the contact plate may include contacts configured to receive power and/or communication signals from the charging station, where the power communicated from the contacts to the plugged-in vehicle via the patch cable receptacles. The wiring may be routed via metal or plastic conduits to protect the wiring from damage. The contact plate contacts may be mirrored about a center contact (which may be a ground contact) so that the proper connections are made even if the pallet has been rotated as described elsewhere herein. If multiple rows of contacts are provided, a given row of contacts on one side of the center of the plate may be mirrored by another row of contacts on the opposite side of the center of the plate.

A patch cord receptacle mounted to the pallet may be angled (e.g., a slight angle) to ease the plugging in of the patch cord to the patch cord receptacle and to inhibit water collecting in the receptacle. The patch cord receptacles may be mounted to the pallet recessed from the top surface of the pallet (on which vehicles may drive) so as to avoid damage that might otherwise occur if a vehicle was driven over the receptacles. Optionally, a scanning device (e.g., a LiDAR scanner an ultrasonic rangefinder sensor, a camera, a millimeter wave radar, and/or the like) may be utilized to determine that the vehicle is placed on the pallet by determining whether the vehicle is within the pallet envelope.

Once it is determined the vehicle is placed on the pallet and optionally secured, the pallet, with the vehicle thereon, may be transported via a conveyor system to a charging station located at a charging stall configured to receive the pallet and the vehicle positioned on the pallet. The charging station may provide power, signaling, and communication to the electric by connecting to the electric pallet coupler. The charging station may also communicate with an electric vehicle charging management system which may be local to the parking structure or may be remote.

Figure 3F:
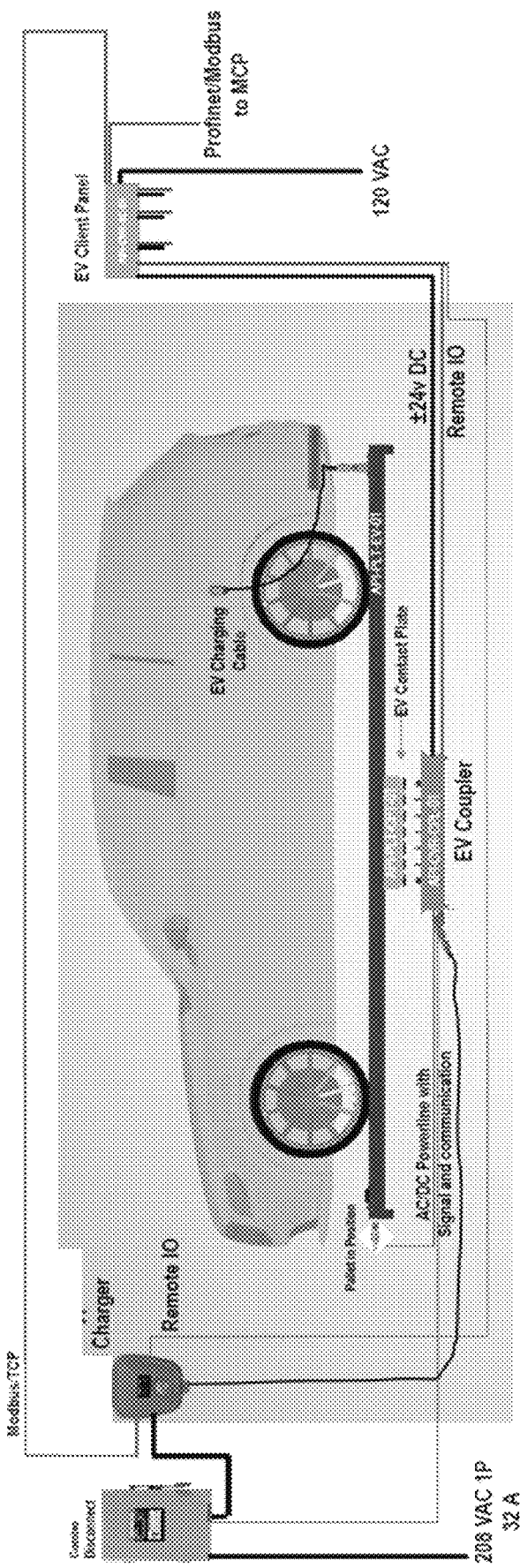

The pallet may be positioned by the conveyor system over an electric vehicle coupler in the stall (see FIGS. 3D and 3F). The coupler may optionally be fixed in its position. A sensor (which may be mounted on the coupler or elsewhere) may detect that the pallet is positioned in a resting state over the coupler. The sensor may be in the form of an opto-electric sensor, a camera, a mechanical switch/linkage, and/or the like. The coupler contacts may electrically engage with the corresponding contacts on the contact plate (e.g., on the bottom side or other side of the pallet). The coupler contacts may be used to supply power to, and signaling and communications from and/or to the pallet. Optionally, communications may be transmitted via the power line conductors. Power-line communication (PLC) carries data on a conductor that is also used simultaneously for electric power transmission or electric power distribution to power consuming devices, such as the electric vehicle.

A low voltage, low current (e.g., 24 VDC) power source, may be provided to via the coupler to the pallet to enable a safe continuity check to be performed, is connected to the electric vehicle, and is detected by the PLC, the PLC will energize the higher voltage (e.g., 240 volts) higher current to initiate charging of the vehicle.

A visual and/or audio indicator (e.g., comprising an indicator LED light, a pixel addressable display (e.g., and LCD display, an OLED display, an E-ink display) and/or the like), and/or a speaker) may provide a visual and/or audio indication when the electric vehicle is being charged. Optionally, the same or different visual and/or audio indicators may provide a visual and/or audio indication when the pallet is being moved from the charging stall, where the indication may be provided for a set period of time or until the pallet has moved a specified distance from the charging stall (e.g., as detected via a sensor, such as one or more of the sensors described herein).

The coupler may include, within a coupler housing, contactors and a protective plate. The number and size of the contactors may be based on voltage and amperage needed for Type I, II, and III charging. The coupler may have a rubber seal positioned around the top perimeter of the coupler.

An electric vehicle client panel may be used to provide remote signal wiring and distribute and power to multiple couplers respective positioned at multiple electric vehicle charging stalls.

After the electric vehicle charging management system has conveyed the electric vehicle to the charging stall via the pallet, and the coupler contacts contact the corresponding pallet contact plate contacts, the system may then monitor and measure the electricity supplied by the charging station to the electric vehicle, and detect when the electric vehicle has completed charging (e.g., based on a signal from the electric vehicle).

As similarly discussed elsewhere herein, the electric vehicle charging management system may then determine if another vehicle is waiting to be charged, and if so, may move the vehicle that has completed charging to a parking space (where the vehicle and pallet may be lifted by a lift onto the parking space, or where the vehicle may be driven by a human or automated driving system off the pallet and into the parking space), and transport the vehicle that needs charging to the charging stall, and the charging process may be repeated. Optionally, the new vehicle may be transported to the charging stall using the same pallet as the previous vehicle (once the previous vehicle has been driven off of the pallet, such as for retrieval by the vehicle user), or a different pallet may be used. The process of swapping vehicles in and out of a charging stall advantageously reduces the number of charging stations needed, and reduces the peak power consumption that might otherwise result if the vehicles are charged in parallel.

Referring now to FIG. 3F, an electric vehicle charging stall is illustrated in still greater detail. A power disconnect panel receives power (e.g., at 208 VAC, 32 amps), and provides the power to an electric vehicle charger configured to charge electric vehicles. The power disconnect panel may include a manual switch which enables an operator to disconnect the power from the electric vehicle charger (e.g., for safety). The electric vehicle charger may include an input/output port coupled to an electric vehicle client panel, which may be coupled to a client panel power source (e.g., 120, 220, or 240 VAC). The electric vehicle charger may also be connected to the client panel via a communication bus, such as one configured for use with programmable logic controller (e.g., using the Modbus protocol).

In addition, the vehicle charger power output is coupled to an electric vehicle coupler which communicates the charger power output to an electric vehicle contact plate mounted to the bottom side of the pallet, as discussed elsewhere herein. The contact plate in turn is connected to the vehicle via an electric vehicle charging cable inserted into the vehicle charge port.

The electric vehicle coupler is also connected to the electric vehicle client panel via a remote input/output bus and via a DC power cable. The input/output bus may communicate a command from the client panel to the coupler to engage the coupler contacts with the pallet contacts. The main control panel may instruct the client panel to provide a relatively low DC voltage (e.g., 28 VDC) at a low current to enable a safety check to be performed, before the vehicle charging power is provided to the coupler and the vehicle. By way of illustration, the low voltage and current may be applied to a first coupler contact, and if detected at a second contact, then a determination can be made that the electric vehicle coupler is in proper position and in proper contact with the pallet contact plate. The relatively high voltage (e.g., 240V), high current power can then be turned on and used to charge the electric vehicle.

If the pallet later shifts so that the pallet contact plate contacts no longer in proper contact with the coupler contacts, the client panel will detect the misalignment, and will command the charger to shut off the charging power to ensure safety.

As discussed above, a surface parking lot or other parking facility may be configured to selectively charge parked vehicles without automatically transporting the vehicles to a charging station. For example, the vehicles may be parked by a user in a parking spot, and rather than rotate the vehicles to charging stations, a given charging station may be configured to selectively provide charging services to multiple sets of parking spots serially (rather than in parallel).

Figure 4:
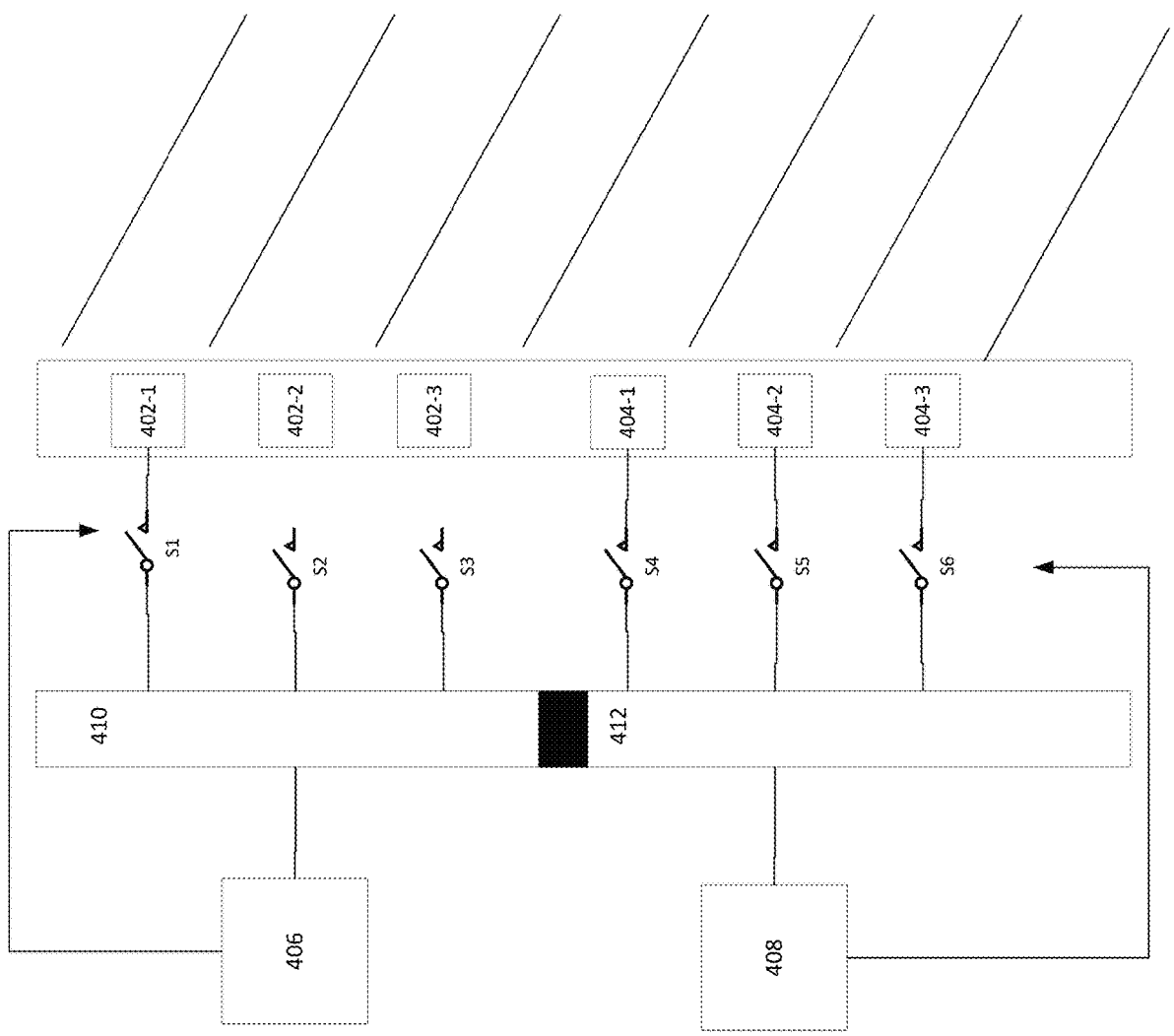
FIG. 4 illustrates another example architecture.

Referring to FIG. 4, an example of a surface lot configuration is illustrated (although the architecture may similarly be utilized with a multi-story parking structure). In this example, charging station 406 selectively provides charging power to head units 402-1, 402-2, 402-3 via a power rail 410 (which may be enclosed in a housing or shielding to prevent contact by people). In this example, the charging station 406 detects when a vehicle is plugged into one of the head units 402-1, 402-2, 402-3 or when charge requests were otherwise received for the vehicles, and optionally based on the order in which vehicles were plugged in to charge and on charge completion of vehicles, the charging station 406 may selectively open or close corresponding contactors S1, S2, S3, to respectively connect or disconnect head units 402-1, 402-2, 402-3 to or from the power rail 410. Optionally, when the charging station 406 detects that no vehicles are plugged into the head units 402-1, 402-2, 402-3, or that all vehicles plugged into the head units 402-1, 402-2, 402-3 are fully charged, the charging station 406 may open all the contactors S1, S2, S3 (e.g., by de-energizing respective contactor coils), so as to disconnect each of the head units 402-1, 402-2, 402-3 from the power rail 410. In addition, if a fault situation is detected (e.g., a component failure, a power short condition, etc.), all of the contactors S1, S2, S3 may be opened to enhance safety.

The charging station 408, may similarly control contactors S4, S5, S6 to selectively provide charging power via head units 404-1, 404-2, 404-3 by selectively connecting or disconnecting head units 404-1, 404-2, 404-3 from power rail 412.

Optionally, to enable users to pay for vehicle charging provided via the parking facility, the head units may be configured with a credit card reader and/or a contactless payment instrument reader (e.g., to enable payment to be made with a suitably configured mobile device, such as a smart phone or smart watch or other wearable).

Charge completion estimates may be generated, and notifications provided to users as similarly discussed above with respect to FIG. 2B and elsewhere herein.

Figure 2D:
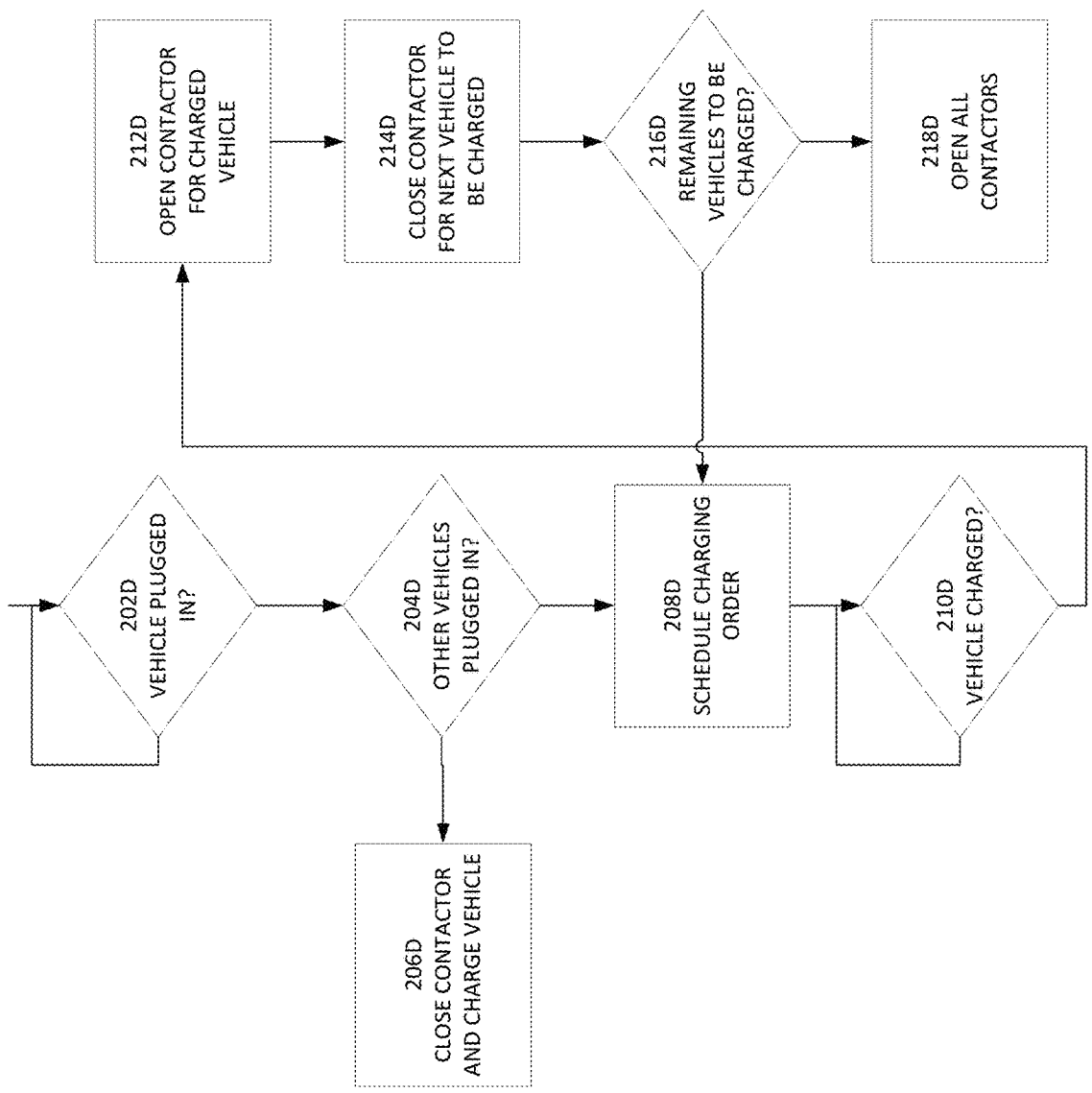

Referring to FIG. 2D, an example process of charging vehicles in a parking facility is illustrated. As similarly discussed above, the parking facility may include parking spots that respectively include a head unit with a vehicle charging cable. Each of the head units for a set of parking spots may in turn be connected to a common charge station that provides vehicle charging power. The common charge station may include a mechanism for selectively providing power to only a subset of the head units at a time (e.g., by opening or closing contactors). The following process relates to the operation of a given charge station, associated head units, and associated power rail contactors.

At block 202D, a determination is made as to whether an electric vehicle has been newly plugged into a given head unit charging cable (e.g., using signaling from the vehicle) and/or whether a new charge request has been otherwise received for the electric vehicle. At block 204D, a determination is made as to whether there are other electric vehicles currently plugged into respective head unit charging cables and/or whether charge requests have been otherwise received for the other electric vehicles, where the other electric vehicles were plugged into respective head unit charging cables prior to the newly plugged in electric vehicle.

If a determination is made that no other electric vehicles are currently plugged in to head unit charging cables associated with the charge station, at block 206D, the contactor corresponding to the given head unit is closed, coupling the given head unit charging cable to a power rail, thereby enabling power to be provided by the charging cable to the newly plugged in vehicle without delay. Optionally, the contactor is not closed until the process detects that the charging cable has been plugged into the vehicle.

If a determination is made that there are other electric vehicles plugged in to head unit charging cables associated with the charge station, at block 208D, the newly plugged in vehicle may be added to a charging queue schedule. The charging queue schedule may be a first-in-first to be charged order, where the vehicles are to be charged in the time order they were plugged in or charge requests where otherwise received.

At block 210D, a determination is made whether a vehicle ahead of the newly plugged in vehicle in the charge order has completed charging or has been unplugged (e.g., by the vehicle user unplugging the vehicle and possibly driving it away). If a determination is made that a vehicle ahead of the newly plugged in vehicle in the charge order has completed charging or has been unplugged, at block 212D, the contactor which was used in charging the charged or unplugged vehicle is opened to disconnect the corresponding head unit from the power rail.

At block 212D, a determination is made according to the charge queue order as to which vehicle is the next to be charged, and closes the corresponding contactor to enable power to be conducted from the charge station to the vehicle.

At block 216D, a determination is made as to whether any vehicles remain to be charged. If a determination is made that no vehicles remain to be charged, at block 218D, all contactors may be opened so that the no charging power is provided by the charging station to the associated charging cables.

Figure 5:
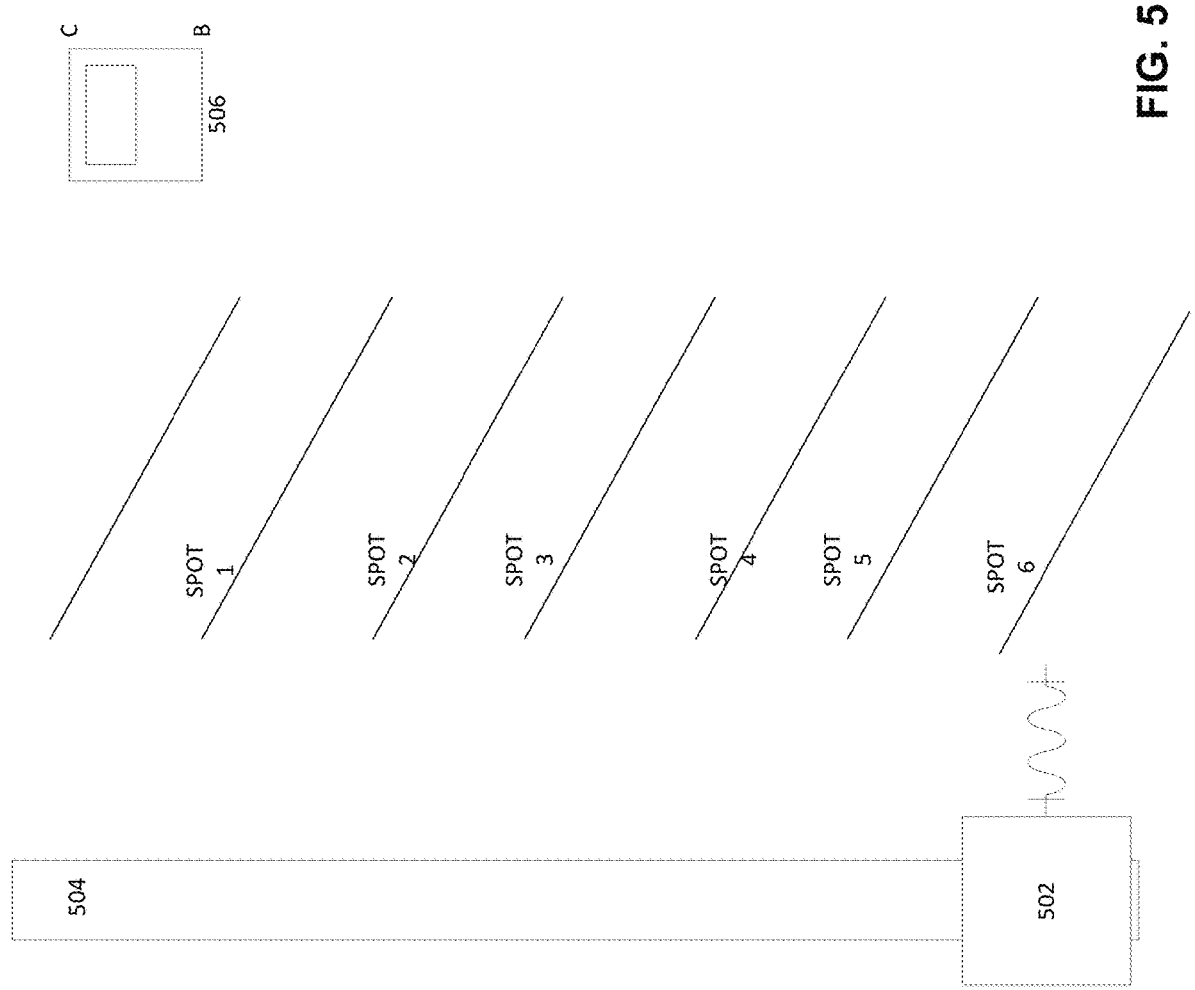
FIG. 5 illustrates another example architecture.

Referring to FIG. 5, another example of a parking facility configuration is illustrated. Certain parking spots may optionally be reserved for charging electric vehicles. The illustrated charge station 502 may be self-contained or several charge stations (and associated charge station transportation mechanisms, such as motors and brakes) may be operated by a common controller, such as described elsewhere herein.

In this example, charge station 502 is mounted on a rail 504 configured to transport the charging station to a parking spot to charge a vehicle. For example, the charging station 502 may include motorized wheels (where the motors may be electrical motors) which can motivate the charge station 502 to a parking space adjacent area, and then brakes may be activated to hold the charge station 502 at the desired position, until it next needs to be transported to a different parking spot, at which time the brakes may be released and the charging station 502 may be transported to the corresponding parking spot. By way of further example, a chain drive or other conveyor mechanism may be used to transport the charge station 502 to a desired position.

A vehicle detection sensor may be located at each parking spot configured to detect when a user has parked a vehicle in the spot. In response to detecting the vehicle being parked, the charge station 504 may be automatically transported to the stall to enable the user to insert the charging cable to the vehicle charge port and initiate charging. Optionally in addition or instead, a panel 506 may be provided configured to receive (e.g., via a physical keypad or touchscreen) a user input of a parking spot number where the user's vehicle awaits a charge and via which the user may request such vehicle charge. A process similar to that described above may be used to sequentially charge vehicles using the charge station 504, where the charge queue order may be a first-in-first-be charged order. Optionally, the charge station 504 is inhibited from providing charging power until it detects that the charging cable has been plugged into the vehicle charge port.

Optionally, to enable users to pay for vehicle charging provided via the parking facility, the panel 506 may be configured with a credit card reader and/or a contactless payment instrument reader (e.g., to enable payment to be made with a suitably configured mobile device, such as a smart phone or smart watch or other wearable).

Charge completion estimates may be generated, and notifications provided to users as similarly discussed above with respect to FIG. 2B and elsewhere herein.

Figure 6:
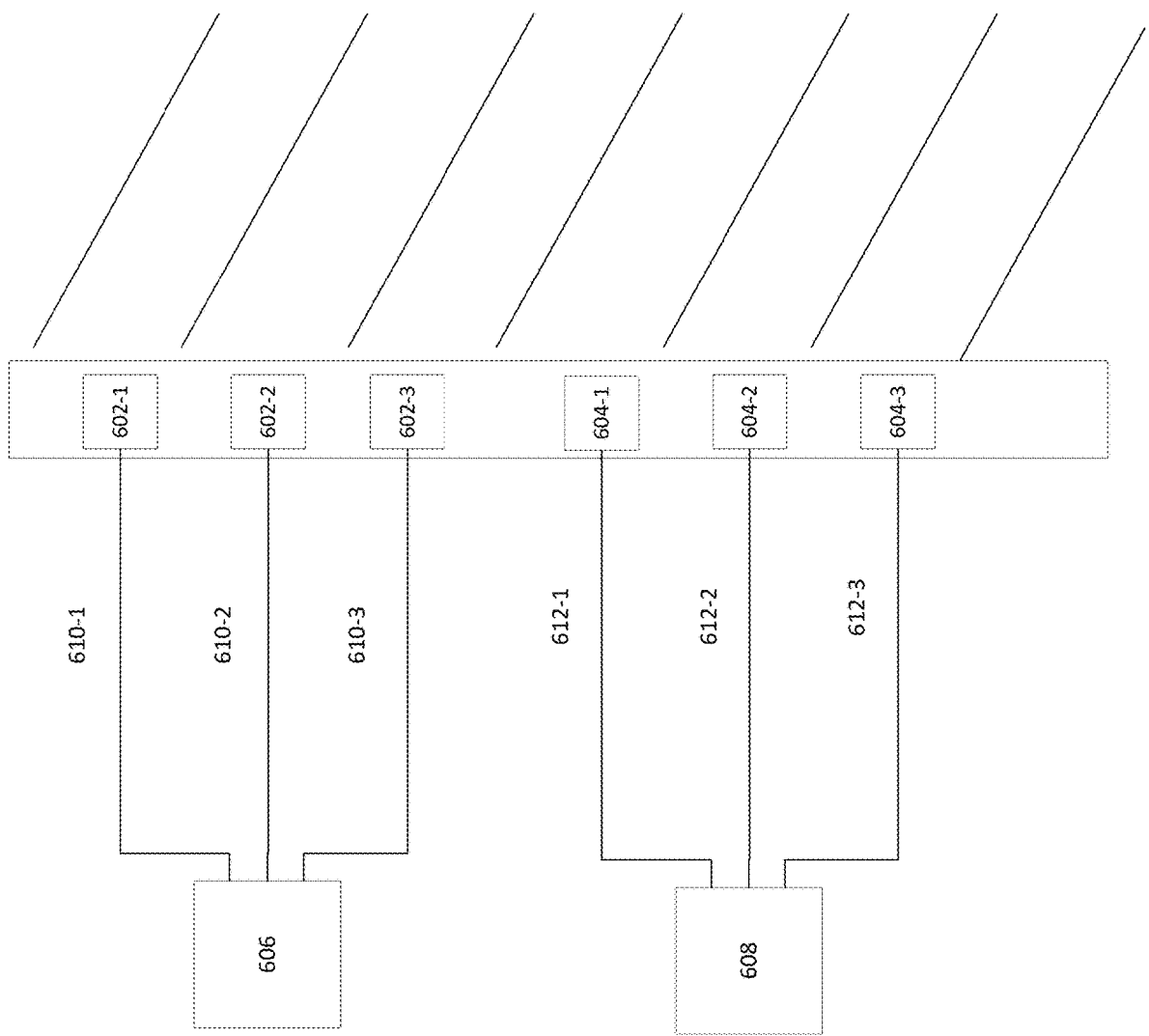
FIG. 6 illustrates another example architecture.

Referring to FIG. 6, another example of a parking facility configuration is illustrated. As similarly discussed above, certain parking spots may optionally be reserved for charging electric vehicles.

In this example, charging station 606 selectively provides charging power to head units 602-1, 602-2, 602-3 via respective power cables 610-1, 610-2, 610-3 (which may be buried so as to be subterranean and may be enclosed in a housing or shielding to prevent contact by people). Similarly, charging station 608 selectively provides charging power to head units 604-1, 604-2, 604-3 via respective power cables 612-1, 612-2, 612-3. Although the following description may refer to charging station 606, charging station 608 may be operated in a similar fashion.

In this example, the charging station 606 detects when a vehicle is plugged into one of the head units 602-1, 602-2, 602-3 or when charge requests were otherwise received for the vehicles. Optionally, based on the order in which vehicles were plugged in to charge and on charge completion of vehicles, the charging station 606 may include internal mechanical or solid state contactors (e.g., circuit breakers) configured to selectively connect power cables 610-1, 610-2, 610-3 to charging power provided via the charging station 606, and hence to selectively and respectively provide charging power to vehicles plugged into head units 602-1, 602-2, 602-3.

Optionally, when the charging station 606 detects that no vehicles are plugged into the head units 602-1, 602-2, 602-3, or that all vehicles plugged into the head units 602-1, 602-2, 602-3 are fully charged, the charging station 606 may open all its contactors (e.g., by de-energizing respective contactor coils), so as to disconnect each of the head units 602-1, 602-2, 602-3 from charging power terminals. In addition, if a fault situation is detected (e.g., a component failure, a power short condition, etc.), all charging station 606 contactors may be opened to enhance safety.

Optionally, as similarly discussed above, to enable users to pay for vehicle charging provided via the parking facility, the head units may be configured with a credit card reader and/or a contactless payment instrument reader (e.g., to enable payment to be made with a suitably configured mobile device, such as a smart phone or smart watch or other wearable).

Charge completion estimates may be generated and notifications provided to users as similarly discussed above with respect to FIG. 2B and elsewhere herein.

The different architectures illustrated in FIGS. 4, 5, and 6 may have particular respective advantages for respective scenarios. For example, where electric vehicles may be parked far from a charging station (e.g., in a large surface lot), the architecture illustrated in FIG. 4 may result in less power loses over the power rail than might be experienced using the individual cables of FIG. 6 and may be less complicated and expensive to implement. On the other hand, where electric vehicles will be parked relatively close to a charging station (e.g., in a multistory parking structure having a relatively smaller two dimensional footprint as compared to a surface lot, where the total square footage (including all the parking structure floors) may be comparable to that of the surface lot), the architecture illustrated in FIG. 6 may be less expensive and quicker to implement.

Systems and methods are disclosed herein that enable electric vehicles to be charged utilizing less land resources and less electrical infrastructure. For example, as discussed above, using conventional approaches, to accommodate simultaneous charging of every vehicle in a parking facility, the power needed to charge 500 vehicles at the same time, at 50 kW per vehicle charger, would require a 25 MW electrical service. Further, assuming 3 vehicles per AC-DC rectifier, a total of 167 rectifiers may be required. By contrast, if, using the disclosed systems and methods of charging vehicles that employ a charging queue, only 140 out of 500 vehicles were to be charged at a time, only 7 MW of electrical service and 47 rectifiers would be needed. The land use and environmental benefits of the disclosed techniques may therefore be substantial.

Thus, technical solutions are disclosed that address power distribution challenges for charging vehicles in parking facilities. Optionally, different solutions may be used for different environments.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system, comprising:
   at least one processing device;
   non-transitory memory that stores programmatic instructions that when executed by the at least one processing device cause the system to perform operations comprising:
   determining that a charge request is received for a first electrical vehicle parked at a first parking spot in a first electrical vehicle parking area;
   determining whether a first battery charging device is available to charge the first electrical vehicle;
   at least partly in response to determining that a charge request is received for the first electrical vehicle parked at the first parking spot in a first electrical vehicle parking area and determining that the first battery charging device is available to charge the first electrical vehicle, connecting the first battery charging device to a first head unit comprising a first charging cable located in proximity to the first parking spot;
   determining that a charge request is received for a second electrical vehicle parked at a second parking spot in the first electrical vehicle parking area;
   determining whether the first electrical vehicle is no longer being charged;
   at least partly in response to determining that the first electrical vehicle is no longer being charged, disconnecting the first battery charging device from the first head unit located in proximity to the first parking spot; and
   at least partly in response to the charge request received for the second electrical vehicle parked at the second parking spot in the first electrical vehicle parking area and in response to determining that the first electrical vehicle is no longer being charged, connecting the first battery charging device to a second head unit comprising a second charging cable located in proximity to the second parking spot.

2. The system as defined in claim 1, wherein the first battery charging device is associated with a plurality of contactors connected to respective electrical conductors, the respective electrical conductors connected to respective head units, wherein connecting the first battery charging device to the first head unit comprising the first charging cable located in proximity to the first parking spot further comprises energizing a contactor connected to an electrical conductor connected to the first head unit.

3. The system as defined in claim 1, wherein the first battery charging device is configured to control a plurality of contactors connected to respective head units, wherein connecting the first battery charging device to the first head unit comprising the first charging cable located in proximity to the first parking spot further comprises energizing a contactor connected to the first head unit so as to connect the first charging cable to a power rail.

4. The system as defined in claim 1, wherein connecting the first battery charging device to the first head unit comprising the first charging cable located in proximity to the first parking spot further comprises energizing an electrical contactor associated with the first head unit.

5. The system as defined in claim 1, wherein determining that a charge request is received for a first electrical vehicle parked at a first parking spot in a first electrical vehicle parking area, further comprises receiving a user entry of a parking spot identifier for the first parking spot via a keypad and activation of a charge request.

6. The system as defined in claim 1, the operations further comprising generating a charge completion time estimate for a given vehicle based at least in part on a number of vehicles awaiting charge ahead of the given vehicle in a charge queue.

7. The system as defined in claim 1, wherein the first electrical vehicle parking area comprises a surface parking lot.

8. The system as defined in claim 1, wherein the first electrical vehicle parking area comprises a multistory parking facility.

9. The system as defined in claim 1, wherein the system is configured to control operations of a plurality of charging stations and of contactors associated with the plurality of charging stations.

10. A computer implemented method, the method comprising:
    determining that a charge request is received for a first electrical vehicle parked at a first parking spot in a first electrical vehicle parking area;
    determining whether a first battery charging device is available to charge the first electrical vehicle;
    at least partly in response to determining that the charge request is received for the first electrical vehicle parked at the first parking spot in the first electrical vehicle parking area and that the first battery charging device is available to charge the first electrical vehicle, connecting the first battery charging device to a first head unit comprising a first charging cable located in proximity to the first parking spot;

determining that a charge request is received for a second electrical vehicle parked at a second parking spot in the first electrical vehicle parking area;

determining whether the first electrical vehicle is no longer being charged;

at least partly in response to determining that the first electrical vehicle is no longer being charged, disconnecting the first battery charging device from the first head unit located in proximity to the first parking spot; and at least partly in response to the charge request received for the second electrical vehicle parked at the second parking spot in the first electrical vehicle parking area and in response determining that the first electrical vehicle is no longer being charged, connecting the first battery charging device to a second head unit comprising a second charging cable located in proximity to the second parking spot.

11. The method as defined in claim 10, wherein the first battery charging device is associated with a plurality of contactors connected to respective electrical conductors, the respective electrical conductors connected to respective head units, wherein connecting the first battery charging device to the first head unit comprising the first charging cable located in proximity to the first parking spot further comprises energizing a contactor connected to an electrical conductor connected to the first head unit.

12. The method as defined in claim 10, wherein the first battery charging device is configured to control a plurality of contactors connected to respective head units, wherein connecting the first battery charging device to the first head unit comprising the first charging cable located in proximity to the first parking spot further comprises energizing a contactor connected to the first head unit so as to connect the first charging cable to a power rail.

13. The method as defined in claim 10, wherein connecting the first battery charging device to the first head unit comprising the first charging cable located in proximity to the first parking spot further comprises energizing an electrical contactor associated with the first head unit.

14. The method as defined in claim 10, wherein determining that a charge request is received for a first electrical vehicle parked at a first parking spot in a first electrical vehicle parking area, further comprises receiving a user entry of a parking spot identifier for the first parking spot and activation of a charge request.

15. The method as defined in claim 10, the method further comprising generating a charge completion time estimate for a given vehicle based at least in part on a number of vehicles awaiting charge ahead of the given vehicle in a charge queue.

16. The method as defined in claim 10, wherein the first parking area comprises a surface parking lot.

17. The method as defined in claim 10, wherein the first parking area comprises a multistory parking facility.

18. A non-transitory memory that stores programmatic instructions that when executed by at least one processing device cause the at least one processing device to perform operations comprising:

determining that a charge request is received for a first electrical vehicle parked at a first parking spot;

determining whether a first battery charging device is available to charge the first electrical vehicle;

at least partly in response to determining that the charge request is received for the first electrical vehicle parked at the first parking spot and that the first battery charging device is available to charge the first electrical vehicle, connecting the first battery charging device to a first head unit comprising a first charging cable located in proximity to the first parking spot;

determining that a charge request is received for a second electrical vehicle parked at a second parking spot;

determining whether the first electrical vehicle is no longer being charged;

at least partly in response to determining that the first electrical vehicle is no longer being charged, disconnecting the first battery charging device from the first head unit located in proximity to the first parking spot; and at least partly in response to the charge request received for the second electrical vehicle parked at the second parking spot and in response determining that the first electrical vehicle is no longer being charged, connecting the first battery charging device to a second head unit comprising a second charging cable located in proximity to the second parking spot.

19. The non-transitory memory as defined in claim 18, wherein the first battery charging device is associated with a plurality of contactors connected to respective electrical conductors, the respective electrical conductors connected to respective head units, wherein connecting the first battery charging device to the first head unit comprising the first charging cable located in proximity to the first parking spot further comprises energizing a contactor connected to an electrical conductor connected to the first head unit.

20. The non-transitory memory as defined in claim 18, wherein the first battery charging device is configured to control a plurality of contactors connected to respective head units, wherein connecting the first battery charging device to the first head unit comprising the first charging cable located in proximity to the first parking spot further comprises energizing a contactor connected to the first head unit so as to connect the first charging cable to a power rail.

21. The non-transitory memory as defined in claim 18, wherein connecting the first battery charging device to the first head unit comprising the first charging cable located in proximity to the first parking spot further comprises energizing an electrical contactor associated with the first head unit.

22. The non-transitory memory as defined in claim 18, wherein determining that a charge request is received for a first electrical vehicle parked at a first parking spot, further comprises receiving a user entry of a parking spot identifier for the first parking spot and activation of a charge request.

23. The non-transitory memory as defined in claim 18, the operations further comprising generating a charge completion time estimate for a given vehicle based at least in part on a number of vehicles awaiting charge ahead of the given vehicle in a charge queue.

24. The non-transitory memory as defined in claim 18, wherein the first parking spot is located in a surface parking lot.

25. The non-transitory memory as defined in claim 18, wherein the first parking spot is located in a multistory parking facility.

* * * * *